US009747618B1

(12) United States Patent
Reiss

(10) Patent No.: US 9,747,618 B1
(45) Date of Patent: Aug. 29, 2017

(54) PURCHASING PACE CONTROL IN A REAL-TIME BIDDING ENVIRONMENT USING A MULTI-LOOP CONTROL SCHEME

(71) Applicant: MaxPoint Interactive, Inc., Morrisville, NC (US)

(72) Inventor: Randy Reiss, Dripping Springs, TX (US)

(73) Assignee: MaxPoint Interactive, Inc., Morrisville, NC (US)

( * ) Notice: Subject to any disclaimer, the term of this patent is extended or adjusted under 35 U.S.C. 154(b) by 93 days.

(21) Appl. No.: 14/605,681

(22) Filed: Jan. 26, 2015

Related U.S. Application Data

(63) Continuation-in-part of application No. 14/133,553, filed on Dec. 18, 2013, and a continuation-in-part of application No. 14/455,535, filed on Aug. 8, 2014.

(51) Int. Cl.
*G06Q 30/02* (2012.01)
(52) U.S. Cl.
CPC ................ *G06Q 30/0275* (2013.01)
(58) Field of Classification Search
CPC .................. G06Q 30/0207–30/0277
See application file for complete search history.

(56) References Cited

U.S. PATENT DOCUMENTS

| | | | | |
|---|---|---|---|---|
| 7,676,578 B1* | 3/2010 | Zhu | ...... | G06F 11/3409 370/232 |
| 7,734,505 B2* | 6/2010 | Miller | ...... | G06Q 30/0601 705/26.3 |
| 8,249,917 B1* | 8/2012 | Kassmann | ...... | G06Q 30/0601 705/12 |
| 9,213,953 B1* | 12/2015 | Kassmann | ...... | G06Q 10/0631 |
| 2003/0174651 A1* | 9/2003 | Morton | ...... | H04L 45/00 370/235 |
| 2006/0224496 A1* | 10/2006 | Sandholm | ...... | G06Q 30/02 705/37 |
| 2008/0167943 A1 | 7/2008 | O'neil et al. | ...... | 705/7.34 |

(Continued)

OTHER PUBLICATIONS

Feedback Control of Real-Time Display Advertising, Zhang, et. al, WSDM 2016, Feb. 22-25, 2016, San Francisco, CA, USA.*

(Continued)

*Primary Examiner* — David Stoltenberg
(74) *Attorney, Agent, or Firm* — Slayden Grubert Beard PLLC

(57) ABSTRACT

A method for controlling a purchasing pace in a real-time bidding environment is provided. A pacing parameter is dynamically adjusted using a multi-loop control algorithm including an outer control loop and an inner control loop, wherein the outer control loop outputs a control parameter, and the inner control loop uses this control parameter as an input and outputs a current value of the pacing parameter, which is adjusted over time by the multi-loop control algorithm. A series of bid requests generated by a real-time bidding exchange are received, each identifying a respective available ad placement in a respective webpage being loaded. For each received bid request, a decision is made in real-time, during the loading of the respective webpage, whether to submit a bid to purchase the respective ad placement based at least on the current value of the dynamically adjusted pacing parameter.

18 Claims, 19 Drawing Sheets

(56) References Cited

U.S. PATENT DOCUMENTS

| | | | |
|---|---|---|---|
| 2008/0208659 A1* | 8/2008 | An | G06Q 10/06315 705/7.25 |
| 2009/0006375 A1 | 1/2009 | Lax et al. | |
| 2009/0106100 A1 | 4/2009 | Mashinsky | 705/14.1 |
| 2009/0132363 A1 | 5/2009 | Powell et al. | 705/14.69 |
| 2010/0050171 A1* | 2/2010 | Liang | G05B 11/011 718/1 |
| 2010/0228631 A1 | 9/2010 | Zhang et al. | 705/14.66 |
| 2010/0262455 A1* | 10/2010 | Karlsson | G06Q 30/02 705/14.45 |
| 2010/0262497 A1* | 10/2010 | Karlsson | G06Q 30/02 705/14.71 |
| 2011/0040636 A1 | 2/2011 | Simmons et al. | 705/14.71 |
| 2011/0191170 A1 | 8/2011 | Zhang et al. | 705/14.46 |
| 2012/0173329 A1 | 7/2012 | Shkedi et al. | 705/14.48 |
| 2013/0124308 A1* | 5/2013 | Hegeman | G06Q 10/04 705/14.48 |
| 2013/0204700 A1 | 8/2013 | Synett et al. | 705/14.53 |
| 2013/0238425 A1 | 9/2013 | Saldanha et al. | 705/14.48 |
| 2013/0346218 A1 | 12/2013 | Liu et al. | 705/14.71 |
| 2014/0006141 A1* | 1/2014 | Vassilvitskii | G06Q 30/0241 705/14.45 |
| 2014/0032306 A1 | 1/2014 | Sukornyk et al. | 705/14.43 |
| 2014/0089106 A1* | 3/2014 | Jordan | G06Q 30/0202 705/14.71 |
| 2015/0088665 A1* | 3/2015 | Karlsson | G06Q 30/0275 705/14.71 |
| 2016/0110755 A1* | 4/2016 | Smirnov | G06Q 30/0244 705/14.43 |
| 2016/0180373 A1* | 6/2016 | Xu | G06Q 30/0272 705/14.43 |
| 2016/0267589 A1* | 9/2016 | Wang | G06Q 30/0241 |

OTHER PUBLICATIONS

Chen, Ye et al., "Real-Time Bidding Algorithms for Performance-Based Display Ad Allocation," 2011 Conference, SIGKDD, Association for Computing Machinery's Special Interest Group on Knowledge Discovery and Data Mining, 9 pages, Aug. 21, 2011.

Bassi, S.J. et al., "Automatic Tuning of Proportional-Integral-Derivative (PID) Controller Using Particle Swarm Optimization (PSO) Algorithm," International Journal of Artificial Intelligence & Applications, vol. 2, No. 4, pp. 25-34 (10 pages), Oct. 2011.

U.S. Non-Final Office Action, U.S. Appl. No. 14/133,553, 26 pages, dated Apr. 21, 2016.

U.S. Non-Final Office Action, U.S. Appl. No. 14/455,535, 35 pages, dated May 6, 2016.

International Search Report and Written Opinion, Application No. PCT/US2014/070893, 7 pages, dated Mar. 20, 2015.

"PID Controller," Wikipedia, URL: http://en.wikipedia.org/wiki/PID_controller, 20 pages, dated (last modified) Feb. 18, 2015.

Kalman, R.E., "A New Approach to Linear Filtering and Prediction Problems," Journal of Basic Engineering, vol. 82, No. 35, 12 pages, dated © 1960.

International Search Report and Written Opinion, U.S. Appl. No. PCT/US2015/044424, 10 pages, dated Dec. 22, 2015.

U.S. Final Office Action, U.S. Appl. No. 14/455,535, 32 pages, dated Nov. 30, 2016.

U.S. Final Office Action, U.S. Appl. No. 14/133,553, 32 pages, dated Oct. 6, 2016.

* cited by examiner

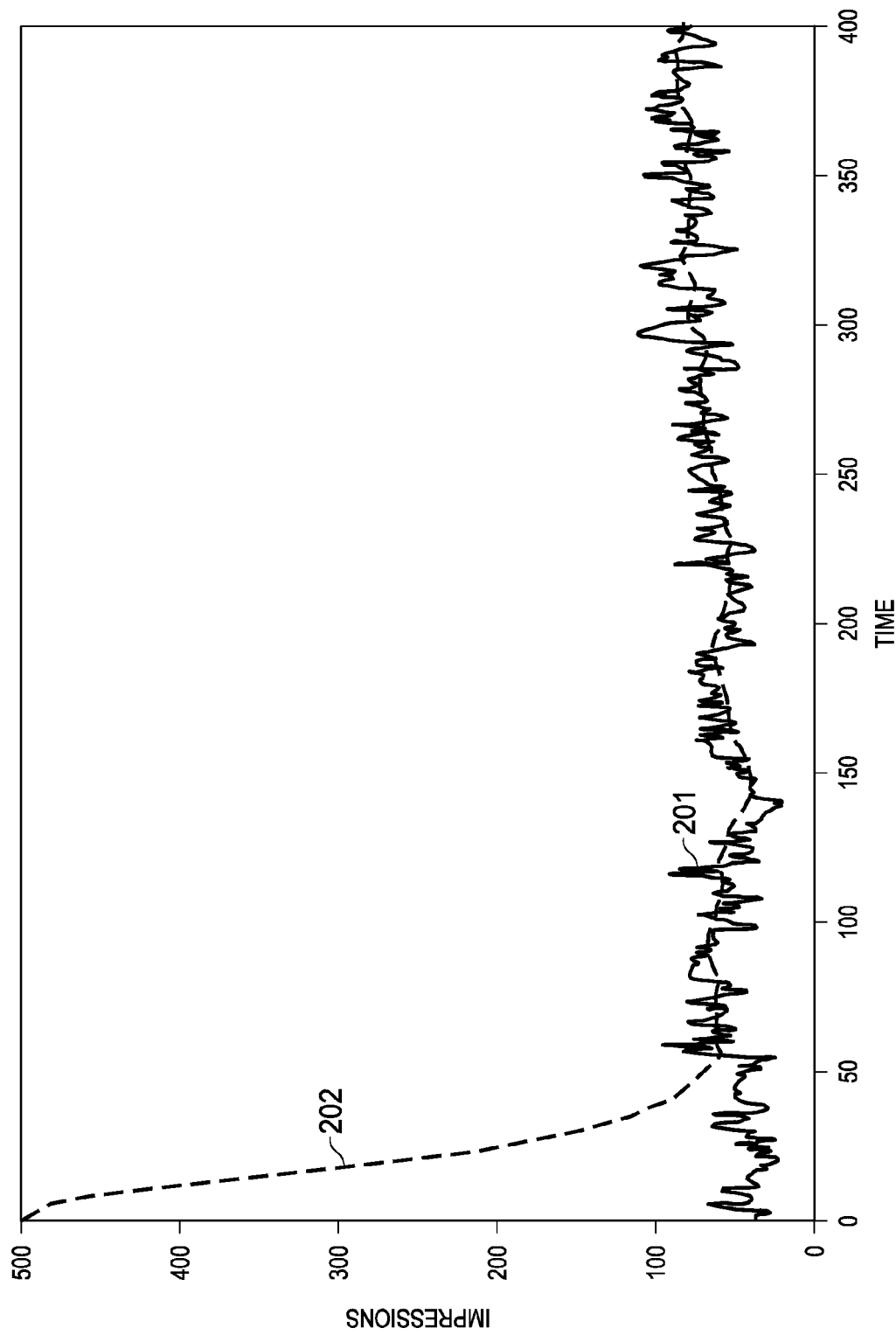

PURCHASING PACE CONTROL IN A REAL-TIME BIDDING ENVIRONMENT USING A MULTI-LOOP CONTROL SCHEME

CROSS-REFERENCE TO RELATED APPLICATIONS

This application is a continuation-in-part of U.S. application Ser. No. 14/133,553 filed on Dec. 18, 2013, which is a continuation-in-part of U.S. application Ser. No. 14/455,535 filed on Aug. 8, 2014, which are incorporated herein in their entirety.

TECHNICAL FIELD

The present disclosure relates in general to the field of computer software and systems, and in particular, to systems and methods for controlling a rate of purchasing online advertisements in a real-time bidding environment.

BACKGROUND

Online advertisement placements generally refer to the slots or space on the pages of a website that are available for displaying advertisements along with their content. Advertisers typically bid on these advertisement placements that are made available through real-time bidding (RTB) exchanges such as AdX, Admeld, Pubmatic, etc.

From a mechanical perspective, online advertisement placement requires a bidding server connected to RTB exchanges. The bidding server then receives bid requests via the RTB exchanges. A bid request occurs when a user/Internet surfer visits a website or publisher that is selling their advertisement space on an RTB exchange. Upon receiving a bid request, the bidding server has a very short period of time to respond to this request (generally under 50 ms). Since this bid response needs to occur in a very short period of time, it is difficult to run large scale models to predict what advertisements to buy and what price to pay for them.

At bid time, the bidding server has to act on some set of rules, models or system instructions that indicate which bid requests it should bid or pass on. This is a non-trivial problem since there are numerous (e.g., billions) requests that could be bought at any given time, those requests are very different and occur randomly throughout the day, and each request needs to be evaluated in milliseconds.

SUMMARY

Methods and systems for controlling a pace of purchasing online advertisements in a real-time bidding (RTB) environment are disclosed.

One embodiment provides a method for controlling a pace of bidding in a network-based real-time bidding environment. The value of a pacing parameter is dynamically adjusted during a duration of a campaign, by executing a multi-loop control algorithm by a control system of the bidding system, the multi-loop control algorithm including at least an outer control loop and an inner control loop. Execution of the outer control loop by the control system output a control parameter, and execution of the inner control loop by the control system receives as an input the control parameter output by the outer control loop, and outputs a current value of the pacing parameter, wherein execution of the multi-loop control algorithm adjusts the current value of the pacing parameter over time. A series of bid requests generated by a real-time bidding exchange are received at the bidding system via a communications network during the duration of the campaign, each received bid request identifying a respective available ad placement in a respective webpage being loaded. For each received bid request, the bidding system determines, in real-time during the loading of the respective webpage, whether to submit a purchase bid to the real-time bidding exchange to purchase the respective ad placement based at least on the current value of the dynamically adjusted pacing parameter.

Another embodiment provides a control system configured to control a pace of bidding in a network-based real-time bidding environment. The control system includes at least one processor and computer-readable instructions stored in non-transitory computer readable medium and executable by the at least one processor to: (a) dynamically adjust the value of a pacing parameter during a duration of a campaign by executing a multi-loop control algorithm including at least an outer control loop and an inner control loop; wherein execution of the outer control loop outputs a control parameter; and wherein execution of the inner control loop receives as an input the control parameter output by the outer control loop, and outputs a current value of the pacing parameter, wherein execution of the multi-loop control algorithm adjusts the current value of the pacing parameter over time; (b) receive via a communications network a series of bid requests generated by a real-time bidding exchange during the duration of the campaign, each received bid request identifying a respective available ad placement in a respective webpage being loaded; and (c) for each received bid request, determine in real-time during the loading of the respective webpage whether to submit a purchase bid to the real-time bidding exchange to purchase the respective ad placement based at least on the current value of the dynamically adjusted pacing parameter.

Another embodiment provides a method for controlling a pace of bidding in a network-based real-time bidding environment. A series of bid requests are received at a bidding system from a real-time bidding exchange, each bid request corresponding to an ad placement in a webpage being loaded. For each received bid request, the bidding system determines, in real-time during the loading of the respective webpage, whether to submit a purchase bid to the real-time bidding exchange to purchase the respective ad placement. The bidding system also executing a multi-loop control algorithm to dynamically control a rate at which purchase bids are submitted to the real-time bidding exchange over time.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

FIG. 5 illustrates an example time series of purchased impressions, and a corresponding Kalman-filtered curve, according to one embodiment;

Figure 1:
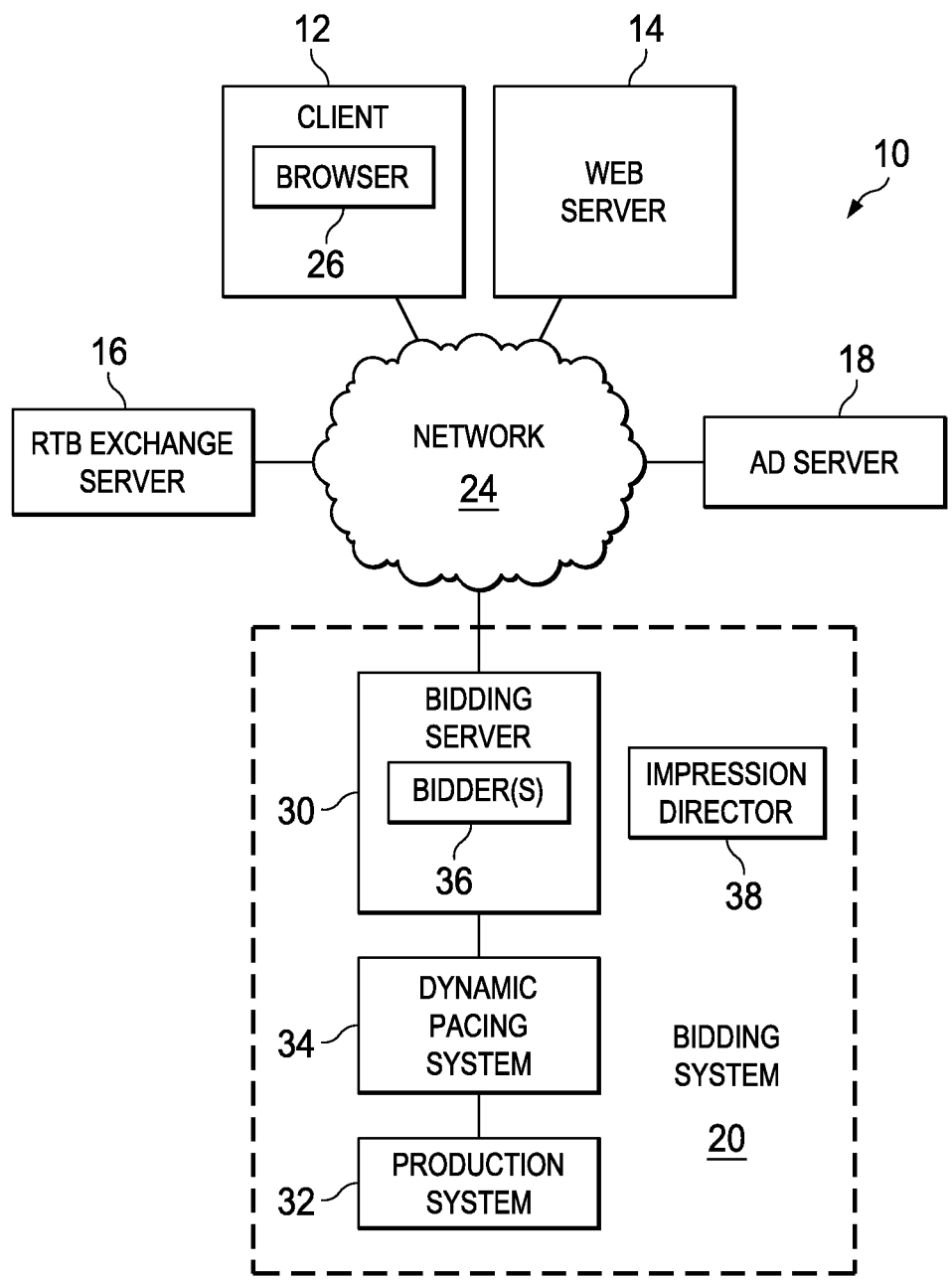
FIG. 1 illustrates an example system level architecture for an real-time bidding online advertising system, according to various embodiments.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

A system and method for controlled purchasing of online advertisements in a real time bidding environment is herein disclosed. According to one embodiment, the computer-implemented method includes receiving a real-time bid request for an online advertisement campaign and determining a score of the real-time bid request. The score elicits desirability for the online advertisement campaign. The computer-implemented method further includes determining a pacing threshold for the online advertisement campaign and bidding on the real-time bid request based on the score of the real-time bid request and the pacing threshold. A bidding pace of the online advertisement campaign is monitored based on a number of impressions won for a given time period, and the pacing threshold is dynamically adjusted based on the bidding pace.

Each of the features and teachings disclosed herein can be utilized separately or in conjunction with other features and teachings to provide a system and method for combining past user events with real-time user events to rapidly respond to advertising opportunities. Representative examples utilizing many of these additional features and teachings, both separately and in combination are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of processes and symbolic representations of operations on data bits within a computer memory. These process descriptions and representations are the means used by those skilled in the data processing arts to most effectively convey the substance of their work to others skilled in the art. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. The steps are not intended to be performed in a specific sequential manner unless specifically designated as such.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods or processes presented herein are not inherently related to any particular computer or other apparatus. Various general purpose systems, computer servers, or personal computers may be used with programs in accordance with the teachings herein, or it may prove convenient to construct a more specialized apparatus to perform the method steps. The structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure. It is also expressly noted that the dimensions and the shapes of the components shown in the figures are designed to help to understand how the present teachings are practiced, but not intended to limit the dimensions and the shapes shown in the examples.

Methods and systems for controlling the purchasing of online advertisements in a real-time bidding environment are disclosed. The methods and systems may use dynamic pacing to control the rate, or pace, at which advertisements are purchased (or bid on in an attempt to purchase) over a period of time, e.g., according to one or more defined target metrics of an advertising campaign. For example, some embodiments provide a dynamic pacing system designed to win a target number of bids (i.e., purchase a target number of advertisement impressions) to meet a target number of impressions for a particular advertisement campaign over a defined period of time. In some embodiments, the dynamic pacing system affects the number of bids won (impressions purchased) by adjusting a bidding pace over time, e.g., by dynamically adjusting one or more factors or thresholds for (a) identifying which bid requests to bid on and/or (b) determining a bid price for each such identified bid request. Because winning a bid request is not guaranteed upon placing a bid (as another entity may bid a higher price), this adds a stochastic element to the disclosed systems and methods.

FIG. 1 illustrates an example system level architecture for a system 10 for controlled purchasing of online advertisements in a real-time bidding (RTB) environment, according to one embodiment. System 10 may include a plurality of clients 12, web servers 14, an RTB exchange system 16, one or more advertisement servers (ad servers) 18 hosting a variety of advertisement content, and one or more bidding systems 20, all connected via a network 24. Each client 12 may host a browser 26 configured to view webpages hosted by web servers 14 via network 24. When a user at a client 12 clicks a link or otherwise opens a webpage, the web server 14 hosting the webpage sends data to RTB exchange system 16 indicating details of each ad placement on the requested page. RTB exchange system 16 then generates a real-time bid request for each ad placement on the requested page and sends each bid request to each bidding system 20 in the system 10. Thus, because each bid request relates to an ad placement for an instance of a page load, each bid request relates to a particular ad impression.

In another embodiment, when a user at client 12 opens the webpage, the webserver 14 hosting the web page serves the webpage to client 12 and includes within that webpage one or more ad tags. Each ad tag is a uniform resource locator (URL) that instructs the web browser of client 12 to load content from RTB exchange server 16. The ad tag may include data indicating details of an ad placement on the requested page. RTB exchange system 16 then generates a real-time bid request for the ad placement on the requested page and sends the bid request to each bidding system 20 in the system 10. RTB exchange server 16 then responds to the ad tag request with web content containing a redirection command (e.g., a HTTP 302 response code) that includes a URL for the ad content selected by the winning bidder. Client 12 interprets the redirection command and requests ad content using the provided URL. This ad content may be, for example, text, an image, streaming content, or some mix of web content.

Each bidding system 20 is configured to analyze each incoming bid request and determine whether to bid on the respective placement/impression, and if so, a corresponding bid price.

RTB exchange system 16 may then determine a winning bid for each bid request, e.g., by comparing the respective prices of bid requests received from multiple different bidding systems 20, and inform the winning bidding system 20 identified in the winning bid. The winning bidding system 20 may then select an appropriate advertisement to be served to the client 12, and impression director 18 may direct the respective ad server 18 hosting the selected advertisement to serve the selected advertisement, such that the advertisement is served in the respective placement (which was identified in the bid request) of the webpage being loaded by the client's web browser 26.

Each bidding system 20 may include any suitable components and utilize any suitable models or algorithms to make bidding determinations for incoming bid requests from RTB exchange server 16. In some embodiments, bidding system 20 may be configured to generate a target delivery plan for purchasing/serving ad impressions for a particular ad campaign, and a pacing system for managing the rate of purchasing impressions over time.

In the example embodiment shown in FIG. 1, a bidding system 20 includes a bidding server 30, a production system 32, a dynamic pacing system 34, and an impression director 38, each of which includes any suitable hardware, software, and/or firmware for performing the respective functions of the bidding system 20. Bidding system 20 may include any number of instances of each component, e.g., multiple bidding servers 30. Further, the various components of bidding system 20 may be located at a common physical location, or may be geographically distributed and communicatively connected by network 24 or other network(s).

Bidding server 30 may include one more bidders 36 that include processing resources and computer code (e.g., software) stored in memory and executable to score incoming bid requests and make real-time bidding determinations based on rules and data supplied by production system 32 and dynamic pacing system 34, and generate and send bid responses to RTB exchange system 16 indicating a decision to bid or pass on each bid request (or alternatively may respond only to bid requests it wishes to bid on) and a corresponding bid price.

Production system 32 may be configured to generate and provide a list of rules to the bidding server 30, which uses the rules to score each incoming bid request. Production system 32 may also be configured to generate and provide a delivery plan to dynamic pacing system 34, which dynamically calculate a pacing threshold value based on the delivery plan. Dynamic pacing system 34 provides the dynamically calculated pacing threshold value to bidding server 30, which compares the bid request score for each incoming bid request against the current pacing threshold value to determine whether to bid on the bid request and, in some embodiments, a bid price.

Production system 32 may store or have access to parameters for an ad campaign (or multiple simultaneously-running ad campaigns), such as a campaign setup, target metrics (goals), and requirements, and may be configured to generate a delivery plan for purchasing and serving ad impressions for a defined lifetime of the campaign, or some other duration. The delivery plan may define different impression purchase quotas or targets for a given period of time, e.g., a month, a week, a day, an hour, a minute, or any combination of such time periods. In some embodiments, the delivery plan may specify a "target delivery profile" that defines a target rate of impressions purchased (target purchase rate) over time for a defined time period, which rate may be static or dynamic over the defined time period. For example, the target delivery profile may define a time-based curve of a dynamic target purchase rate over time, which curve may be generated based on known time-based dynamic information, such as a dynamic internet activity curve, a dynamic traffic curve for a particular website, a dynamic online traffic curve for users in a particular geographic region, or any other suitable data. Each advertisement instance (impression) purchased by the bidding system is served, i.e., delivered, to a respective end user. Thus the term "target delivery profile" can also be referred to or understood as a "target purchasing profile."

Impression director 38 comprises a server configured to direct ad servers 18, which may be owned by third parties distinct from bidding system 20, to serve advertisements upon notification of winning bids by RTB exchange 16. In some embodiments, each bid submitted by bidding server 30 includes a pointer (URL) to the impression director server 38. When a bid submitted by bidding system 20 wins the respective auction at RTB exchange 16, the exchange 16 notifies the impression director 38 via the pointer (URL), and the impression director 38 then identifies and directs the appropriate ad server 18 to serve the appropriate ad. Impression director 18 may collect and store data regarding the ads (impressions) served over time, which data may be supplied as feedback to bidding system 20 for influencing subsequent decisions of bidding system 20. For example, in some embodiments, e.g., as discussed below with reference to FIGS. 13-16, impression director 18 may count the number ads (impressions) served over time, which may be used as feedback for influencing the pacing of impression purchasing.

System 10 typically benefits a web publisher (i.e., a person or business providing content on web server 14) by allowing a vast number of advertisers to bid for the right to display ads along the publisher's content. The competition among advertisers may offer web publishers greater ad revenue and/or lower costs to obtain ad revenue compared to a scenario where a web publisher has to contract with individual advertisers. System 10 also benefits advertisers by allowing access to a vast number of web publishers.

Technical Challenges Presented by "Real-Time" Bidding Protocols

RTB Exchanges 16 typically implement a protocol that requires that the bidding process for each ad placement of a loading webpage be completed within a time period of a small fraction of a second, e.g., within 80, 100, or 120 milliseconds, i.e., a period of time that is generally less than the 100-400 milliseconds it takes to blink one's eyes. One goal of a "real-time" bidding process is to keep bid response times (and thus web page load times) fast enough to keep the user's attention. Research into user behavior has shown that users expect web pages to load quickly and will abandon a website if load times are too long. For example, one 2009 study concluded that consumers expect a load time of no more than two seconds, which is twice as fast as the expected load time reported by a similar study conducted in 2006.

The real-time bidding process, which typically must be completed within a small fraction of a second as discussed above, is an extremely complex process involving numerous network-based communications between different entities and execution of numerous, often very complex, processing and decision-making algorithms. For example, real-time bidding process typically involves, upon selection (e.g., by a user) of a webpage for loading, generation of a bid request for each ad placement included in the webpage, sending the bid request for each placement from a real-time bidding exchange to a plurality of bidding systems, each bidding system analyzing each bid request and executing various bidding algorithms to determine whether to bid on each bid request, as well as determining a bid price for each bid, and sending the bids back to the exchange, and the exchange receiving the bids from the bidding systems, selecting a winning bid for each ad placement, and sending out notifications of the winning bids. This entire process is completed within the fraction of a second as defined by the relevant RTB protocol, and repeated for every page load of any webpage having ad placements specified for real-time bidding.

Thus, with reference to the system shown in FIG. 1, bidding system 20 must respond to each bid request received from an RTB exchange server 16 in a fraction of the time the RTB exchange server 16 is allotted for responding to an ad request. This processing time allotted to bidding system 20 may be 10 milliseconds, 20 milliseconds, or up to 100 milliseconds in some cases. In some systems, the RTB exchange server 16 may select a winning bid as soon as it has received a threshold number of bids, rather than holding the auction open for a preset time. In such systems, a bidding system 20 with a bid response time of 20 milliseconds may have a measurable competitive advantage over another bidding system 20 that could only respond to a bid in 40 milliseconds.

Thus, based on the above, the real-time bidding process presents enormous technical challenges that are unique to the real-time bidding environment, e.g., as compared with conventional advertising techniques and even previous online advertisement protocols. For example, prior to the advent of real-time bidding for online advertisements, an advertiser would typically purchase blocks of ad impressions (e.g., in increments of 1,000) from selected web sites, which web sites would then serve the purchased ads over a specified period of time. This previous process did not involve anywhere near the level of technical complexity or extremely fast "real-time" processing required by the real-time bidding systems discussed herein. Thus, the real-time bidding process for online advertisements introduces unique technical challenges that did not previously exist. In addition, as RTB bidding systems become more complex, e.g., by attempting to target particular customers or websites having particular content, the required algorithms and processing resources become even more challenging and complex.

As used herein, the term "real-time" in the context of "real-time bidding" refers to a bidding processing for ad placements in a webpage that occurs during the loading of the webpage, and in some bidding systems is further defined by a specified time period for completion of the bidding process (e.g., 100 ms) during the loading of the page. In other contexts (e.g., with respect to the determination and/or adjustment of a pacing threshold value for controlling the rate of purchasing impressions), the term "real-time" means (a) according to a defined time schedule of operations (e.g., as specified by a relevant external or internal protocol) and/or (b) in an ongoing manner during the ongoing execution of a related process (e.g., a related process that uses that output of the relevant "real-time" process as input) or during the ongoing execution of the respective ad campaign, as would be understood by one of ordinary skill in the art in view of the relevant context of each respective use of the term.

Figure 2A:
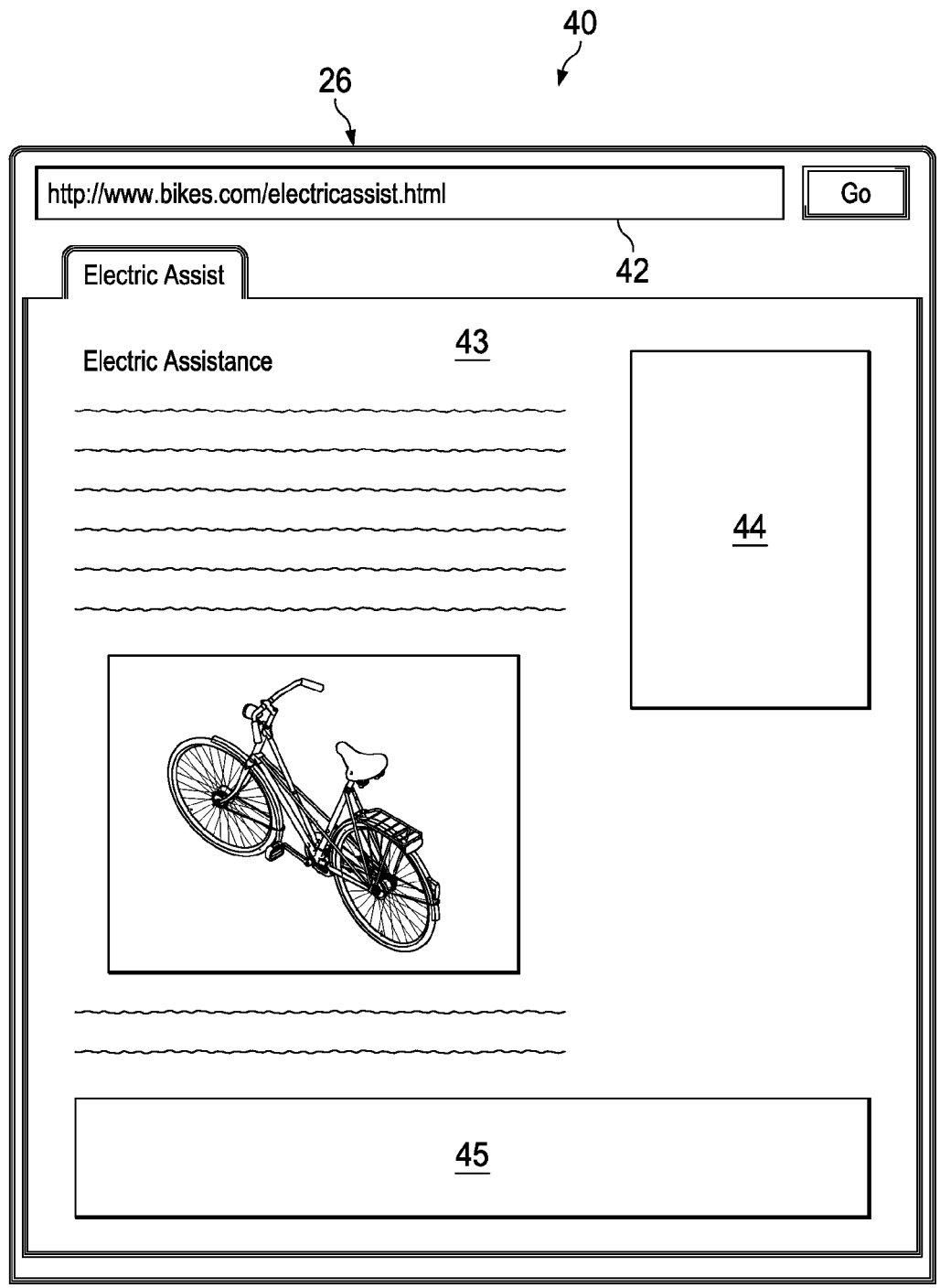
FIG. 2A illustrates an example snapshot of a web browser display, according to one embodiment.

FIG. 2A illustrates an example snapshot 40 of web browser 26 showing the display at client 12 of system 10, according to one embodiment. Snapshot 40 comprises URL address bar 42 and web content 43. Snapshot 40 illustrates a partially rendered web page showing content retrieved by client 12 from web servers 14 via network 24 but shows unpopulated ad placement locations 44 and 45. In some embodiments, ad placements may be rendered before or at least partially simultaneously with the remaining content in the web page; however, this illustration shows the primary web content rendered first to illustrate the ad placement locations. Web content 43 as shown in snapshot 40 is an article about electric assistance systems to aid bicycle riders on long rides or up hills.

Figure 2B:
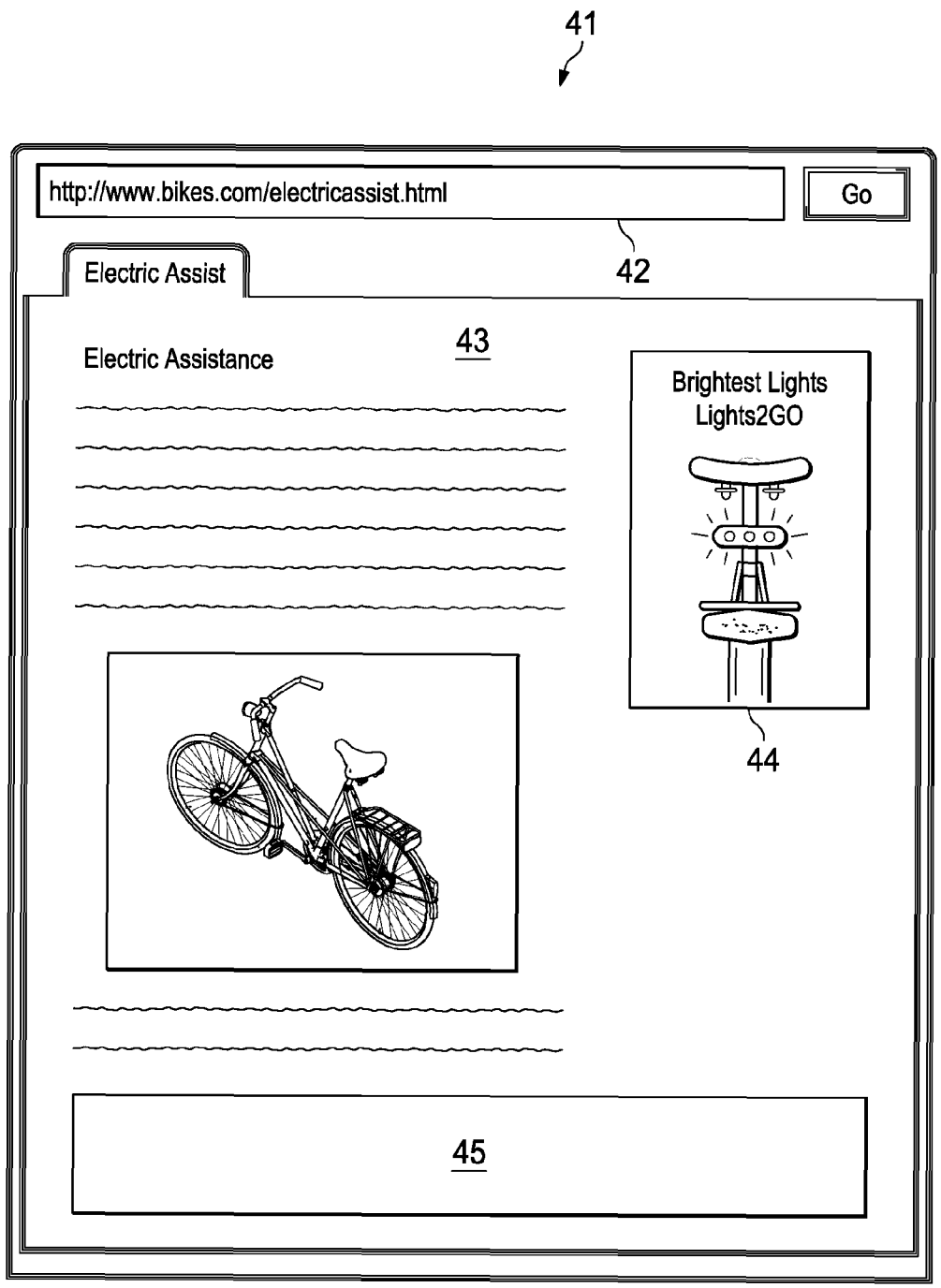
FIG. 2B illustrates another example snapshot of a web browser display, according to one embodiment.

FIG. 2B illustrates an example snapshot 41 of web browser 26 showing the display at client 12 of system 10, according to one embodiment. Snapshot 41 comprises URL address bar 42 and web content 43. Snapshot 40 illustrates a partially rendered web page showing content retrieved by client 12 from web servers 14 via network 24, populated ad placement location 44, and unpopulated ad placement location 45. Ad placement location 44 is shown populated with ad content received from, for example, a particular ad server 18 corresponding to the winning bid selected by RTB exchange system 16. In snapshot 41, ad placement location 44 is populated with an advertisement for bicycle lights, while web browser 26 may be loading an advertisement for a political campaign to be rendered in ad placement 45.

Dynamic Pacing of Impression Purchasing

As mentioned above, production system 32 may provide the delivery plan to dynamic pacing system 34, which may dynamically calculate a pacing threshold value based on the delivery plan. In particular, production system 32 may generate one or more "target delivery profiles" (also referred to as target purchasing profiles) for dynamically controlling the rate of impression purchasing over the duration of the campaign, wherein the pacing threshold is dynamically adjusted according to the target delivery profile currently implemented by dynamic pacing system 34 (e.g., via a PID control that takes the target delivery profile as an input and outputs the pacing threshold). As discussed below, in some embodiments dynamic pacing system 34 may dynamically adjust the target number of purchased impressions for individual time segments in real-time or substantially in real-time using control loop feedback, e.g., as implemented using a PID controller or PI controller. Partitioning the delivery plan into the smaller time segments may allow dynamic pacing system 34 to manage the impression purchasing process more accurately.

Figure 3:
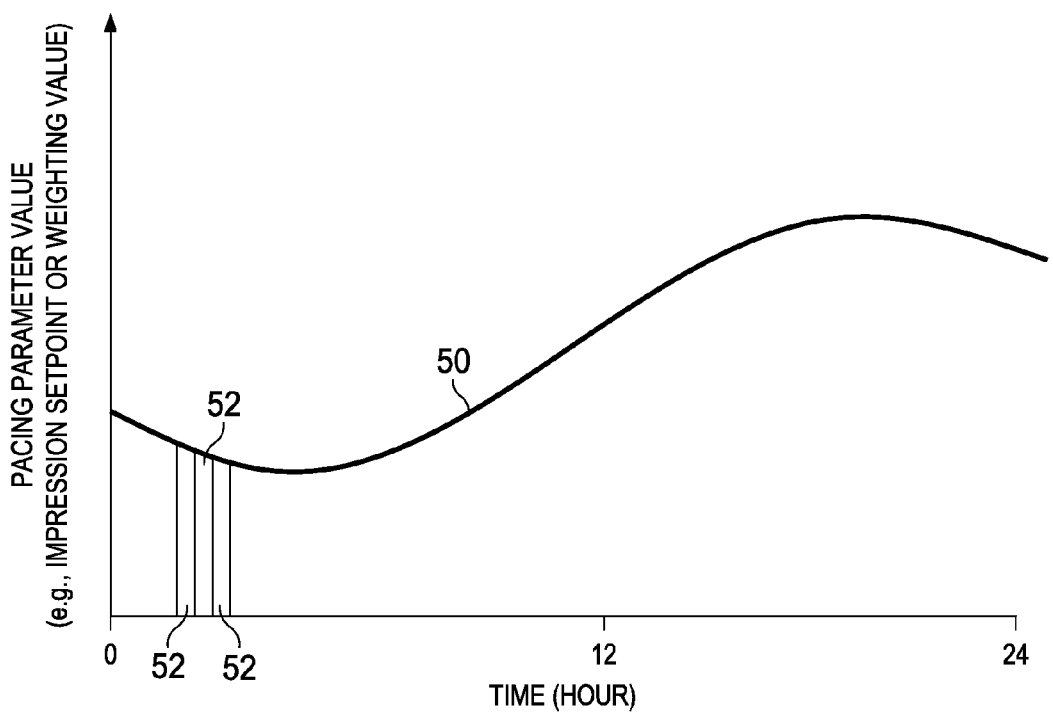
FIG. 3 illustrates an example target delivery profile divided into a series of time segments, according to one embodiment.

A "target delivery profile" is a time-based profile of one or more pacing parameters related to a target rate of impression purchasing over a defined time period (the profile duration) during a campaign. The profile duration of a target delivery profile may be divided into a series of smaller time segments (e.g., a series of 1 hour time segments within a 24-hour target delivery profile, or a series of 1 minute time segments within a 1-hour target delivery profile), with the target delivery profile defining a value or values for each relevant pacing parameter for each time segment, wherein the parameters values may be constant or may vary from each time segment to the next. The parameters value(s) defined by the target delivery profile for the series of time segments define a curve, or "profile," when plotted as parameters value(s) versus time, e.g., as shown in FIG. 3 and discussed below.

A pacing parameter may comprise any parameter, characteristic, or variable that influences the rate of purchasing by bidding system 20. For example, the pacing parameter may represent the number of impressions to be purchased. Thus, a target delivery profile may define, for each time segment (e.g., 1 hour) of the profile duration (e.g., 24 hours), a target number of impressions to be purchased during that time segment.

As another example, the pacing parameter may represent a proportion or set of proportions of a total number of impressions to be purchased for a period of time. Thus, a target delivery profile may define, for each time segment, a target proportion of a total number of impressions to be purchased during the profile duration. The target proportion of impressions may be may be represented by a set of weighting values assigned to the series of time segments, such that each individual time segment is weighted (by a specified weighting value) relative to the other time segments based on the proportion of the total impression purchases specified for that individual time segment. Thus, in such embodiments, a target delivery profile is compiled and stored as a set of weights, rather the actual number of impression to be served, as the total number of impressions to be purchased depends on the number of impressions that were actually purchased/served at the end of the previous time segment.

For example, assume a 10-day campaign that uses a different 24-hour target delivery profile during each day, with each 24-hour target delivery profile divided into 1-hour segments. Further assume that during Day 3 of the campaign, the actual number of impressions purchased during Hour 7 falls 2,000 impressions short of the target specified for that hour. Thus, there are now 2,000 additional impressions to be served for the remaining duration of the campaign, as compared to the original projection for this point during the campaign.

Production system 32 may then dynamically compute the target number of impressions to be purchased in the next hour (Hour 8) to make up for this 2,000 impression shortfall. For example, production system 32 may dynamically compute the target number of impressions to be purchased during Hour 8 of Day 3 (and similarly for each hour of the campaign) according to the following algorithm. First, production system 32 updates the count of the remaining number of impressions to be served during the remainder of the campaign (i.e., adds 2,000 to the count).

Production system 32 then reallocates this updated count over the remaining days of the campaign, based on an original number or proportion of the total impression purchases for the campaign assigned to each day, e.g., as defined by the proportions or weights specified by the target delivery profiles of the respective days. For example, the reallocation of the updated count may allocate the additional required 2,000 impression purchases over the remaining days as follows: remainder of Day 3=+150 impressions; Day 4=+200 impressions; Day 5=+400 impressions; Day 6=+400 impressions; Day 7=+350 impressions; Day 8=+300 impressions; Day 9=+200 impressions; Day 10=+100 impressions.

Production system 32 then re-allocates the target number of impressions for the remainder of Day 3 based on the updated allocation for Day 3, specifically +150 impressions. Production system 32 may allocate this target number according to the proportions or weights specified by the Day 3 target delivery profile for each remaining hour of Day 3, such that the target number of impressions for each remaining hour of Day 3 is proportionally increased by some portion of the 150 additional impressions.

Thus, by storing a set of proportions or weights as each target delivery profile, production system 32 may apply an algorithm such as discussed above to dynamically determine target numbers of impression purchases for remaining time periods during a campaign, e.g., to dynamically account for or compensate for the past and current performance of the ongoing campaign.

FIG. 3 illustrates an example of a target delivery profile 50 generated by production system 32. Example target delivery profile 50 defines a profile duration of 24 hour period, which is divided into 1,440 one-minute time segments 52 (not shown to scale), and defines a pacing parameter value for time segment 52. As discussed above, the target delivery profile 50 may explicitly define a target number of impression purchases for each time segment 52, referred to herein as the "impression setpoint" for that time segment 52. Alternatively, as discussed above, the target delivery profile 50 may define a value of a weight or proportion for each time segment 52 that represents a proportion of a total target number of impression purchases assigned to that time segment 52, and from which the target number of impression purchases (impression setpoint) for each respective time segment 52 is dynamically calculated by production system 32, e.g., as discussed above regarding the example 10-day campaign. In other embodiments, the target delivery profile 50 may define any other pacing parameter value(s) from which an impression setpoint can be calculated for each time segment 52, or any other pacing parameter value(s) from which dynamic pacing system 34 may dynamically control a pacing threshold value, or any other pacing parameter value(s) that may be used by bidding server 30 for making bidding decisions and, in particular, to control the pace of bidding purchases.

Thus, in some embodiments, a target delivery profile may directly specify a target number of impression purchases, i.e., an impression setpoint, for each time segment, or may specify one or more other pacing parameter values from which the target number of impression purchases, i.e., impression setpoint, for each time segment is calculated by bidding system 20.

It should be understood that any reference herein to a target delivery profile defining target impression purchase numbers or impression setpoints (e.g., for each time segment) refers to a target delivery profile that either specifies impression setpoints (target impression purchase numbers) directly, or specifies one or more other pacing parameter values from which impression setpoints (target impression purchase numbers) are calculated by bidding system 20.

As discussed above, the target delivery profile 50 may be generated based on any suitable data, e.g., known time-dependent information, such as a dynamic internet activity curve, a dynamic traffic curve for a particular website, a dynamic online traffic curve for users in a particular geographic region, or any other suitable data.

In some embodiments, target delivery profile 50 may be repeatedly replaced by a new, dynamically generated target delivery profile 50 after completion of each profile duration. For example, where the target delivery profile has a 24 hour (1 day) duration, the target delivery profile may be replaced by a new, dynamically generated target delivery profile every day. Thus, the shape of the target delivery profile may change from day to day, e.g., based on differences in known or expected internet activity patterns corresponding to the respective days. In addition, the magnitude of the target delivery profile may change from day to day, e.g., based on tracked performance of the ongoing campaign (e.g., where the tracked performance is ahead of or behind schedule for the campaign).

Dynamic pacing system 34 may dynamically calculate a pacing threshold value designed to control the pace of impressions purchases over time such that the actual purchasing performance tracks the target delivery profile over time. For example, dynamic pacing system 34 may dynamically calculate the pacing threshold value based on the target number of purchased impressions for each time segment, and the ongoing performance of the campaign (e.g., number of impressions purchased in previous time segment(s)), and/or other relevant input data. In some embodiments, dynamic pacing system 34 may dynamically calculate the pacing threshold value in real-time or substantially in real-time (e.g., for each successive time segment) using control loop feedback, e.g., as implemented using a PID controller or PI controller.

Bidding server 30 may then determine whether to bid on each incoming bid request based on a comparison of the bid request score for that bid request and the current pacing threshold value as calculated by dynamic pacing system 34. For each bid request, bidding server 30 may determine to bid on the bid request if the respective bid request score is greater than or equal to the current pacing threshold value, calculate a corresponding bid price using any suitable model or algorithms, and communicate a bid response including the details of the bid to RTB exchange server 16, which may then determine a winning bid for the bid request, e.g., by comparing the respective prices of bid requests received from multiple different bidding systems 20, as discussed above.

Thus, in some embodiments, the bidding process for online advertisement impressions includes scoring bid requests for each ad placement/impression and deciding whether or not to bid on the impression based at least on the respective bid request score. For example, each bid request may be scored based on a relative level of desirability for purchasing the respective impression. Examples of such scores include a numerical score, a rank, a preference order, or a category to purchase or a general grouping concept. For example, each incoming bid request may be scored numerically on a scale from 0 to 20, from very undesirable (score=0) to very desirable (score=20). In another example embodiment, each incoming bid request is instead scored on a scale from 0 to 10. It is contemplated that any type of scoring schemes may be used to indicate a relative level of desirability without deviating from the present subject matter.

As discussed above, a dynamic pacing system may be employed to determine whether or not to bid on each bid request (and in some embodiments, a bid price for each bid) based on desirability scores calculated for the respective bid requests. In some embodiments, the present dynamic pacing system dynamically adjusts a pacing threshold value over time with the goals of (a) purchasing/serving a target number of online advertisements (impressions) in a particular time period, as defined by or based on the performance goals for a particular ad campaign, and (b) purchasing/serving the impressions according to a target delivery plan, e.g., by dynamically controlling the rate of impression purchases according to a target delivery profile during the particular time period.

Further, in some embodiments, the dynamic pacing system 34 may dynamically update the delivery plan for an ad campaign over time during the execution of the campaign, e.g., based on the current performance or performance-to-date of the campaign. For example, dynamic pacing system 34 may dynamically update a target delivery profile (or the remainder of the target delivery profile) based on the number of impressions purchased/served during a particular time and the remaining number of impressions to achieve the campaign performance target.

As discussed above, dynamic pacing system 34 may determine a pacing threshold value (e.g., from 0-20) for each time segment, in real-time or substantially in real-time (e.g., by adjusting the pacing threshold value used during the previous time segment or maintaining the same pacing threshold value) based on a target number of impressions to win for a given time period, e.g., that time segment, multiple time segments, the remainder of the campaign duration, or other relevant time period. The pacing threshold value set by the present dynamic pacing system 34 represents the minimum bid request score that bidding server 30 will bid on. In one embodiment, at the beginning of the campaign or some other starting point within the campaign, dynamic pacing system 34 sets the pacing threshold for the first time segment (e.g., 1 min segment) to a predefined initial value, e.g., the maximum score (e.g., 20) which represents the most desirable bid requests, thereby beginning with maximum purchasing selectivity.

In some embodiments, dynamic pacing system 34 may then periodically determine whether to update or maintain the current pacing threshold value. For example, dynamic pacing system 34 may periodically—e.g., after each time segment or after each N time segments—determine whether to adjust or maintain the pacing threshold value based at least on (a) the number of bids won (i.e., impressions purchased) during that time segment (or that time segment plus N previous time segments or all previous time segments), and (b) the target number of bids to win (impressions to purchase) in the next time segment, next N time segments, or all subsequent time segments in a defined period or the full campaign. For example, if the number of bids won in a particular time segment (or previous N time segments) exceeds the target number for such time segment(s), dynamic pacing system 34 may increase the pacing threshold value with the intent to win fewer impressions in subsequent time segment(s) and thereby steer the performance back toward the target delivery profile or other target metric.

The pacing threshold value represents a measure of purchasing aggressiveness by the bidding system 20. For example, a threshold value close to the minimum score (e.g., 0), provides aggressive purchasing, in which the bidding system typically has little difficulty winning the target number of impressions for a given campaign. Adjusting the pacing threshold values toward the maximum score (e.g., 20) decreases the aggressiveness of the purchasing, by increasing the selectivity of bid requests to bid on.

Dynamic pacing system 34 may also (e.g., in combination with the dynamic adjustment of the pacing threshold value) control purchasing aggressiveness, and thus the pace of purchasing over time, by selecting or controlling bid prices for placed bids over time. For example, dynamic pacing system 34 may increase purchasing aggressiveness, and thus the number of impressions won, by offering higher bid prices; or alternatively decrease purchasing aggressiveness, and thus the number of impressions won, by offering lower bid prices. Thus, dynamic pacing system 34 may simultaneously incorporate both dynamic pacing threshold value control and dynamic bid price control to regulate the rate of impressions purchased over time as desired, e.g., based on target metrics.

In some embodiments, to adjust the pacing threshold value and change bidding parameters based on bidding pacing, the dynamic pacing system 34 accounts for the number of impressions being won (purchased) at the current pacing threshold value. An example equation for determining a sum of a conditional expectation (sumE) of a number of impressions that are won at a particular pacing threshold value at a point in time provides:

$$\mathrm{sum}E[I|T],$$

where I is a number of impressions that are being won and T is the pacing threshold value at a point in time.

Typically, determining the number of impressions won is measured on a noisy time series, such that adjusting the threshold value with confidence may be difficult. In such system, there is typically some uncertainty regarding the number of impressions that the bidding system is purchasing at a given threshold. The bidding system may buy more or fewer impressions because of a change to the pacing threshold value or a change in activity in a RTB exchange system (e.g., more advertisements available for purchase). Or, there could be a large random fluctuation in the time series. In one embodiment, in order to more accurately estimate the number of bid requests that are being won, dynamic pacing system 34 applies a smoothing process to smooth a data set and separate the signal from the noise. For example, dynamic pacing system 34 may apply a calibrated Kalman filter to an observed time series. This model may provide a much more accurate representation of the number of impressions are being purchased at any given time segment or period.

Figure 4:
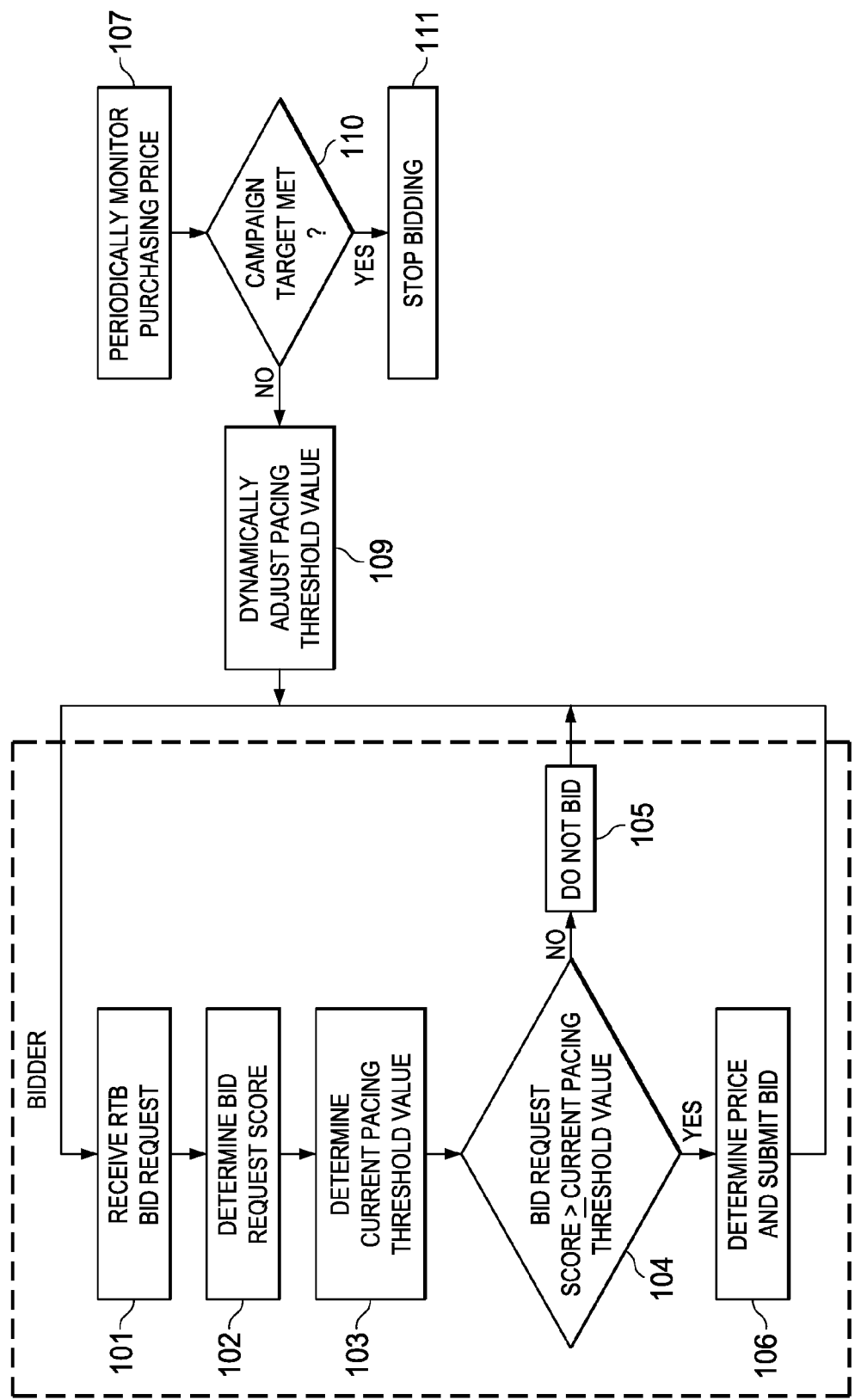
FIG. 4 illustrates a flowchart for an example method dynamically controlling a purchasing by dynamically adjusting a pacing threshold value, according to one embodiment.

FIG. 4 illustrates a flowchart for a general method for dynamically controlling a pacing of purchasing for an online advertisement campaign in an RTB system, according to some embodiments. At step 101, bidding system 20 receives a real-time bid request from RTB exchange system 16 for an ad placement in a webpage being loaded via a client browser 26. Bidding server 30 scores the real-time bid request at step 102, e.g., based on rules supplied by production system 32. The bid request score indicates a desirability of the respective ad placement with respect to the online advertisement campaign, as discussed above.

Dynamic pacing system 34 determines a current pacing threshold value for the ad campaign at step 103, which value may be periodically determined and adjusted as discussed below. Bidding server 30 then compares the bid request score with the current pacing threshold value at step 104 to determine whether to bid on the placement identified by the bid request. If the bid request score fails to satisfy (e.g., is less than) the current pacing threshold value, bidding server 30 determines to not bid on the bid request at step 105, and the process returns to step 101 to process further incoming bid request. Alternatively, if the bid request score satisfies (e.g., is greater than or equal to) the current pacing threshold value, bidding server 30 generates and communicates a bid to the RTB exchange system 16 at step 106. Bidding server 30 may determine a price for the bid using any suitable data and algorithms.

As the ad campaign continues and bid requests are processed and either bid on or passed on, dynamic pacing system 34 periodically monitors the purchasing pace for the campaign over time based on the number of impressions won for a given time period at step 107. Dynamic pacing system 34 may monitor the pace at any desired frequency, e.g., every time segment (e.g., every 1 min), every N time segments, upon a predefined triggering event, or according to any other specified frequency or times. At step 108, dynamic pacing system 34 determines whether the goal of the online ad campaign (e.g., total number of impressions served) has been met. If the goal has not been met, dynamic pacing system 34 dynamically adjusts the pacing threshold value, if appropriate, based on various factors, e.g., the determined purchasing pace, a target delivery profile, one or more campaign goals or settings, etc., at step 109. The dynamically adjusted pacing threshold value is then used for evaluating subsequent incoming bid requests, as indicated by the arrow from step 109 to step 101, until the next adjustment of the pacing threshold value. Once the goal of the ad campaign is met, bidding system 20 stops bidding at step 110.

Kalman Filtering

Dynamic pacing system 34 may employ one or more filters or other algorithms to increase the effectiveness of the dynamic control/adjustment of the pacing threshold value to increase the effectiveness of the dynamic control, e.g., by managing outlier data or rapid variations or spikes in the data. For example, in some embodiments, dynamic pacing system 34 may employ a Kalman smoothing filter or other smoothing filter to the number of impressions won during a previous time period, e.g., one or more time segments.

FIG. 5 illustrates an example of applying a Kalman filter to a time series of impressions won (purchased) by a bidding system 20 for a particular ad campaign. Line 201 shows the actual number of impressions won in each time segment, in this case each minute. Line 202 shows the Kalman-filtered data, which provides a prediction of the number of impressions expected to be won in a given time period (e.g., segment).

The Kalman-filtered data may be used as input for dynamically controlling the pacing threshold value. For example, the system may use the Kalman-filtered impressions won data to determine a current degree of divergence from a defined target number, e.g., as defined by a target delivery profile. Dynamic pacing system 34 may calculate a difference between the Kalman-filtered impressions won data for a particular time period (e.g., one or more time segments) and a target number of impressions purchased for that time period, and use such calculated difference for determining adjustments to the pacing threshold value over time.

As known in the art, a particular Kalman filter can be defined by a number of variables or parameters. These include the covariance of the process noise, Q, and the covariance of the observation noise, R. In some embodiments, the noise covariance parameters Q and R are held static throughout a pacing process (e.g., campaign). In other embodiments, observation noise covariance parameter R and process noise covariance parameter Q are both dynamically controlled/adjusted over time by dynamic pacing system 34. In still other embodiments, observation noise covariance parameter R is dynamically controlled/adjusted by dynamic pacing system 34, while the process noise covariance parameter Q is held constant (e.g., Q=1). For example, dynamic pacing system 34 may dynamically adjust covariance parameter R based on a moving window of variance, e.g., based on the calculated variance of the previous N measurements (wherein each measurement may be a number of impressions served in a particular time segment, for example). In one embodiment, dynamic pacing system 34 employs the following algorithm for dynamically controlling covariance parameter R:

1. $MeasVar_1$=the variance of the last N measurements (e.g., N=5).
2. $R=HighLimit-(abs(1.0-(MeasVar_1-MeasVar_{T-1}))*HighLimit$
3. R cannot be less than LowLimit
4. Q=1; the variance of the model Further, the measurement variance may be stabilized by taking the square root of the measurement and squaring the output.

It should be understood that the observation noise covariance parameters R and Q may be dynamically controlled using any other suitable algorithm.

PID Control

In some embodiments, dynamic pacing system 34 employs a control process to calculate the direction and magnitude of adjustments to the pacing threshold value based at least in part on such Kalman-filtered (or otherwise filtered or smoothed) data. As an example of such control process, dynamic pacing system 34 may employ a proportional-integral-differential (PID) control process for dynamically controlling the pacing threshold value (or alternatively, a proportional-integral (PI) control process, without derivative-based control or a proportional derivative (PD) control process, without the integral-based control).

The PID control process takes in an error value and outputs a change variable (thereby implementing a "velocity controller") or a raw output value (thereby providing a "positional controller"), depending on the particular embodiment. For example, in some embodiments, dynamic pacing system 34 employs a PID controller that takes in a calculated difference between a Kalman-estimated number of bids won/impressions served and a target number of bids won/impressions served, and outputs an adjustment to the pacing threshold value, or alternatively, outputs the actual value of the pacing threshold value. The PID control process is an online process, i.e., the PID control process computes input data serially, and thus need not run over historical data, and further relies on current information that is updated to reflect the current error.

The PID control utilized by dynamic pacing system 34 may incorporate any or all of the technical concepts disclosed at http://en.wikipedia.org/wiki/PID_controller as of the date of filing of this application, which disclosure is included herein at the end of the Detailed Description section and in FIGS. 18A-18E.

Figure 6:
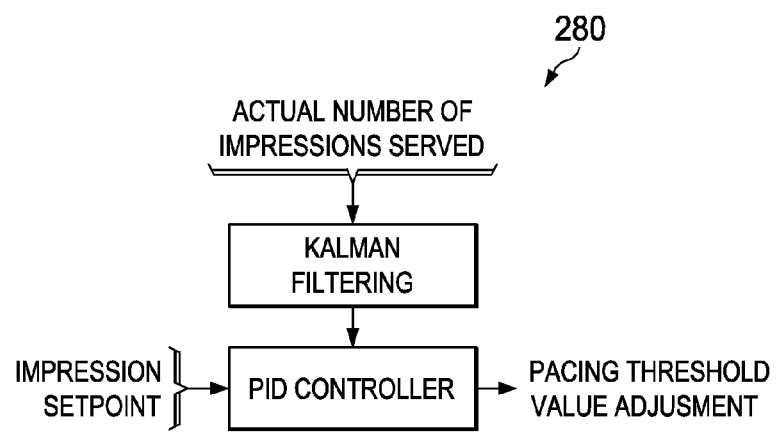
FIG. 6 illustrates an example PID controller for dynamically adjusting a pacing threshold value, according to one embodiment.

FIG. 6 illustrates a PID controller 280 of dynamic pacing system 34, according to one embodiment. As shown, PID controller 280 receives as inputs (a) the target number of impressions served for each time segment (referred to herein as the "impression setpoint"), e.g., as defined by a segmented target delivery profile, and (b) the actual number of impressions served in such time segments, calculates a difference between the impression setpoint and actual impressions served, referred to as the "error," and calculates and outputs an adjustment to the pacing threshold value. Alternatively, the PID controller may take inputs (a) as the target number of impression served for each time segment, and (b) the actual number of impression served in such time segments, calculate the error, and calculate the output as the actual pacing threshold. Thus, with reference to FIG. 3, the impression setpoint for each time segment 52 is the target number of bids won/impressions served for that time segment, as defined by the target delivery profile 50. Further, as shown in FIG. 6, the impressions served data may be filtered using a Kalman filter as discussed above, or otherwise filtered or smoothed using any suitable algorithm. PID controller 280 may account for the previous adjustment to the pacing threshold value and adjust the pacing threshold value based on various factors, e.g., the proportion of the last error, the sum (or integral) of previous errors, and the differential change in the error from the previous time period to the current time period.

The PID controller 280 may embody the following equation, incorporating the P (proportional), I (integral), and D (derivative) components:

$$K_P*(\text{error}) + K_I*\int(\text{error}) + K_D*d(\text{error})/dt$$

wherein $K_P$, $K_I$, and $K_D$ are tuning constants

Thus, the Proportional component, $K_P*(\text{error})$, is directly proportional to the error. The Integral component, $K_I*\int(\text{error})$, integrates the error over time, and thus acts as a continuous memory. The Derivative component, $K_D*d(\text{error})/dt$, represents the change in error over time. The tuning constants $K_P$, $K_I$, and $K_D$ can be tuned (e.g., adjusted by a user or automatically by dynamic pacing system 34) to provide a desired response, e.g., minimizing error by providing a fast response with little overshoot.

According to standard PID control techniques, PID controller 280 may calculate and use the "raw error" as the "error" term shown above, with the "raw error" defined as the mathematical difference between the actual number of impressions served for a particular time period (e.g., a time segment or N time segments) and the impression setpoint (i.e., target number of impressions served) for that time period.

However, in some embodiments, PID controller 280 may calculate and use a "relative error" as the "error" term shown above, with the "relative error" defined as the raw error for a particular time period divided by the impression setpoint for that time period:

Relative error=(raw error for time $x$)/(impression setpoint for time $x$)

The inventors have discovered that this approach simplifies the ability to tune PID controller 280, e.g., where PID controller 280 is used for multiple different ad campaigns. Thus, using the relative error instead of the raw error provides a cross-campaign standardized tuning technique.

Figure 7:
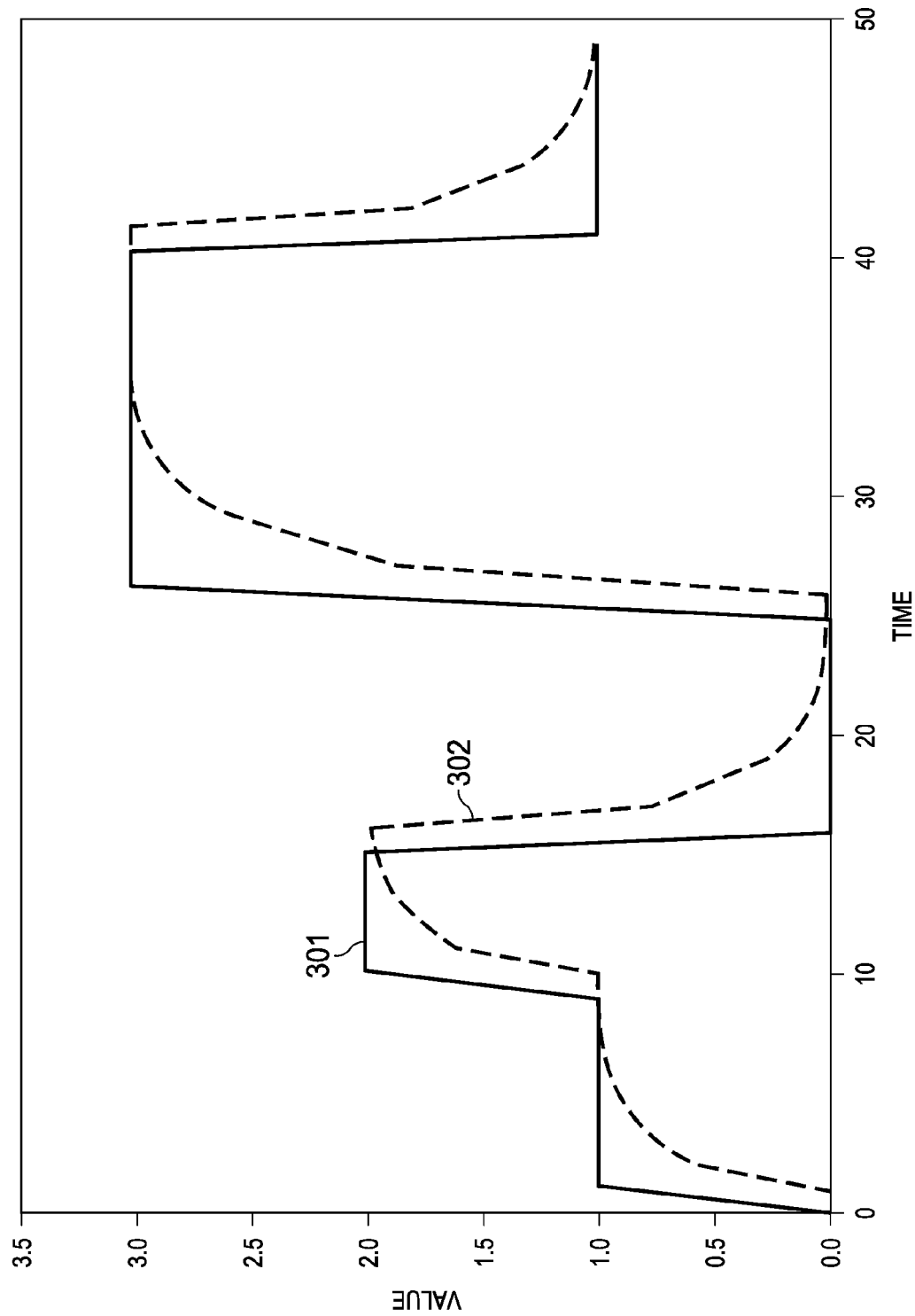
FIG. 7 illustrates a plot of example results of an example pacing control process, according to one embodiment.

FIG. 7 illustrates an example operation of PID controller 280 to dynamically control the number of bids won/impressions served by dynamically adjusting a pacing threshold value, according to one embodiment. Line 301 indicates the impression setpoint (target number of impressions served) for each time segment over a 50 segment period. Thus, line 301 may represent a target delivery profile for an ad campaign. Line 302 indicates the actual number of impressions served for each time segment. PID controller 280 dynamically adjusts the pacing threshold value to influence the likelihood of winning incoming bid requests with the goal of tracking the moving impression setpoint (target delivery profile) over time.

PID controllers are typically configured to be sensitive to the particular system that they are used to control. In many commercial applications, PID controllers require tuning of relevant PID parameters (e.g., tuning constants) by experts to customize the controller to the particular application. In some embodiments of the present invention, the dynamic pacing system 34 automatically tunes and adjusts various PID parameters based on the current status of the system. Dynamic pacing system 34 may employ various optimization techniques for tuning the PID parameters of controller 280. For example, dynamic pacing system 34 may implement an automated heuristic tuning method, e.g., a Ziegler-Nichols method or any other variant, to tune one or more PID parameters of controller 280. In one embodiment, dynamic pacing system 34 employs a particle swarm optimization and evaluates the PID parameters after every step taken. Dynamic pacing system 34 may thus look back at the previous time period and simulate the step size that system 34 would have taken if the PID parameters were set to some other value(s). In this case, dynamic pacing system 34 may decide which alternative PID parameter values to evaluate. For example, dynamic pacing system 34 may adjust each of the PID parameter values in both possible directions (greater and smaller) at a time, and perform a simulation for each PID value or every combination of PID values. After the simulation is completed, dynamic pacing system 34 may compare the step size that all other theoretical PID models would have taken in the previous time period to the step size that is actually taken by PID controller 280. By evaluating the step size of all of the PID models, the dynamic pacing system 34 may selects the PID model that takes the best step size based on the set of PID parameter values that provided a results closest to a relevant impression setpoint or other target metric. This moves the model implemented by PID controller 280 slightly in a parameter space. At each iteration, the model implemented by PID controller 280 may be automatically and periodically adjusted over time based on how well it is suited to the current optimization task (e.g., how to adjust the threshold value) assigned to the controller. Another example is the use of a static tuning formula that takes the PID controller output and the value of the smoothed relative error and computes a specific set of tuning parameters that best meet the desired behavior of the PID loop for the particular ad campaign.

In some embodiments, dynamic pacing system 34 employs an optimization based on customized business rules. Examples of business rules include, for example, the biggest step size that dynamic pacing system 34 can select in set time intervals, maximum and minimum threshold values, and system stability checks.

Figure 8:
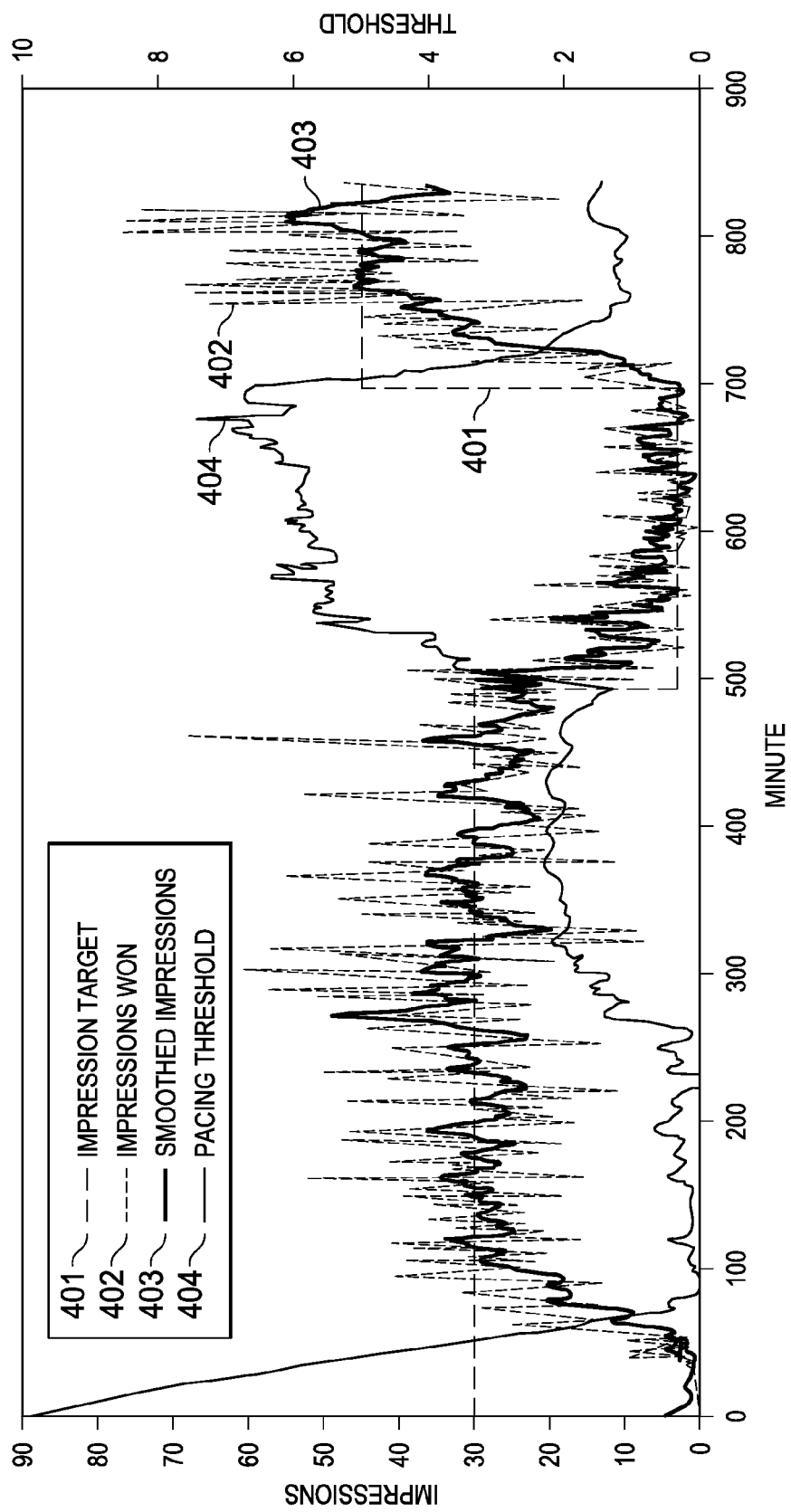
FIG. 8 illustrates another plot of example results of an example pacing control process, according to one embodiment.

FIG. 8 illustrates an example plot for a dynamic pacing process performed by dynamic pacing system 34 employing a PID controller 280, for an example "campaign," according to an example embodiment. Line 401 is a target delivery profile (target purchasing profile) for a campaign duration of 835 minutes, which is divided into 835 one-minute time segments. Thus, the target delivery profile 401 indicates the impression setpoint for each one-minute time segment, which impression setpoint decreases at the 500 minute mark and then increases at the 700 minute mark, as shown. Target delivery profile 401 for the campaign may be predefined prior to beginning the pacing process. Target delivery profile 401 may be automatically generated by bidding system 20, manually input into bidding system 20 by a user, or some combination of the two. As discussed above, target delivery profile 401 may be designed such that total number of impression setpoints for all 835 one-minute time segments (i.e., the integrated area under curve 401) equals a predefined target number of impressions for the campaign. Further, target delivery profile 401 may be designed (shaped) based on various input data, e.g., a known internet activity curve, a known traffic pattern for a particular website, a known online traffic pattern for users in a particular geographic region, or any other suitable data. In some embodiment, target delivery profile 401 may remain static during the campaign. In other embodiments, target delivery profile 401 may adjusted during the campaign, by a user or automatically by bidding system 20, e.g., if the actual performance of the campaign substantially deviates from the target or if there is a detection that the internet usage patterns of target users has changed.

Line 402 indicates the number of impressions that are actually won in each one-minute time segment. As shown, line 402 varies sharply from minute to minute. As discussed above, the actual impression served data may be filtered or smoothed. Thus, line 403 is a Kalman-filtered version of the actual data of line 402, which indicates the number of impressions expected to be won in each time segment. Line 404 indicates the pacing threshold value, which is automatically and dynamically adjusted by the auto-tuning PID controller 280 implemented by dynamic pacing system 34, as discussed above. PID controller 280 adjusts the pacing threshold value with the goal of matching the actual number of impressions served indicated by lines 402/403 with the target delivery profile 403 as best as possible.

Figure 9:
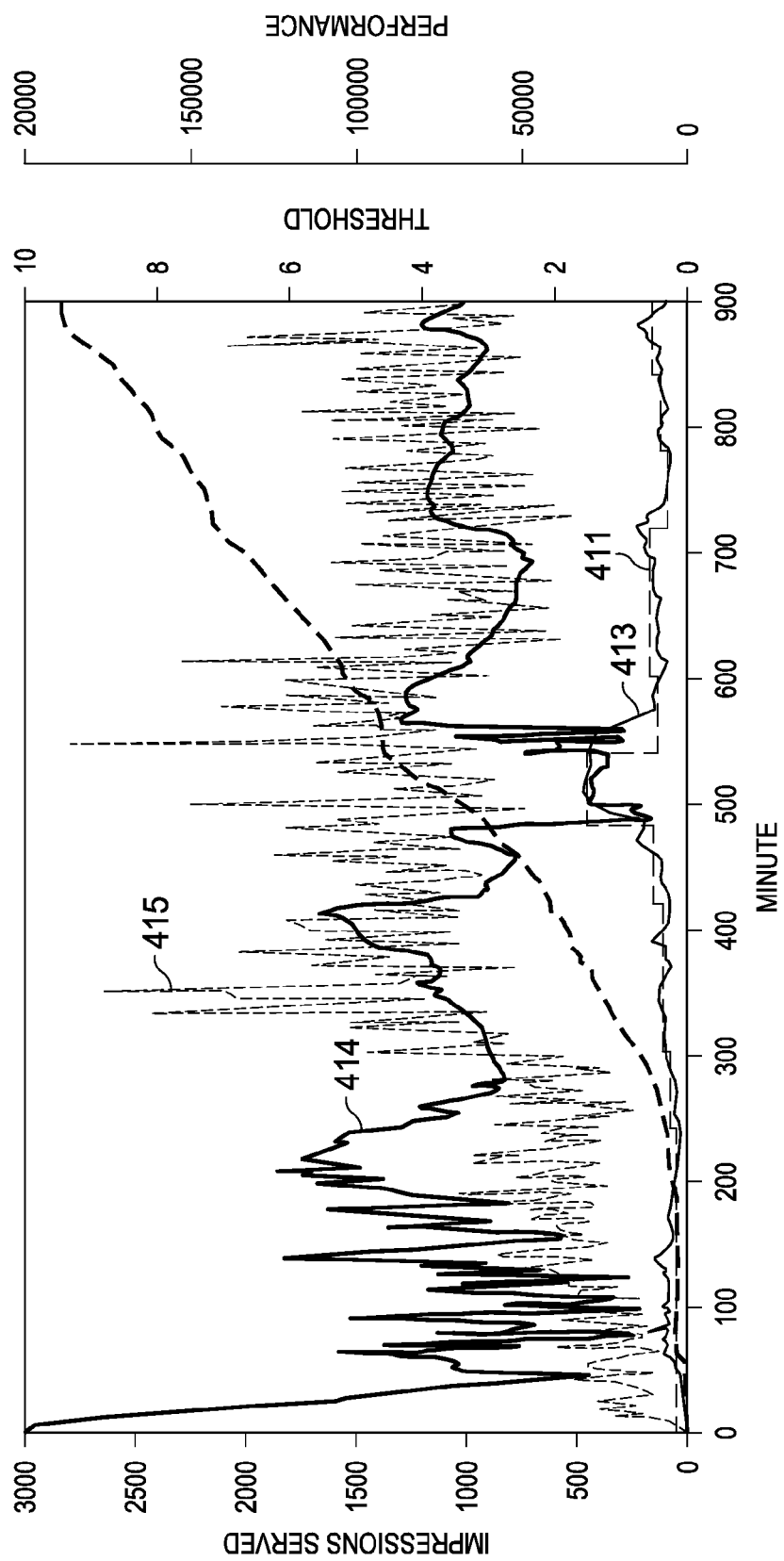
FIG. 9 illustrates yet another plot of example results of an example pacing control process, according to one embodiment.

FIG. 9 illustrates another example plot for a dynamic pacing process performed by dynamic pacing system 34 employing a PID controller 280, for another example "campaign," according to an example embodiment. Line 411 is a predefined target delivery profile for the campaign, in this case a 900 minute campaign, again divided into one-minute time segments. Line 415 indicates the number of bid requests received by the bidding system 20 during each time segment. Line 413 indicates a smoothed version of the actual impressions served data, e.g., corresponding to line 403 of FIG. 9. Line 414 indicates the dynamically adjusted pacing threshold value.

Setpoint Smoothing

As can be seen in FIGS. 8 and 9, with dynamic control of a parameter using PID control (e.g., the pacing threshold value in this case) or other feedback-loop control, there is typically a time lag involved in the dynamic response (e.g., actual impressions served) to a change in the setpoint (e.g., impression setpoint). After the time lag, the response is then steered to match the setpoint. In a typical industrial control, these aspects of PID control are typically not problematic, as the typical goal is to achieve a setpoint value (e.g., temperature or pressure) in a reasonable duration of time without overshooting the setpoint. Thus, the key issue is the instantaneous difference between the actual parameter value and the setpoint value. In contrast, in the context of an online ad campaign, a key goal as discussed herein is to serve a target number of impressions over the campaign duration, which is represented by the integrated area under the target delivery profile (i.e., moving setpoint curve). Thus, unlike in an industrial application, in the present application the integrated area under the response curve is important, as it should match the integrated area under the target delivery profile (i.e., the target number of impressions for the campaign). In this regard, the time lag associated with the response may provide an integrated area under the response curve to that is greater than or less than the integrated area under the target delivery profile.

Figure 10A:
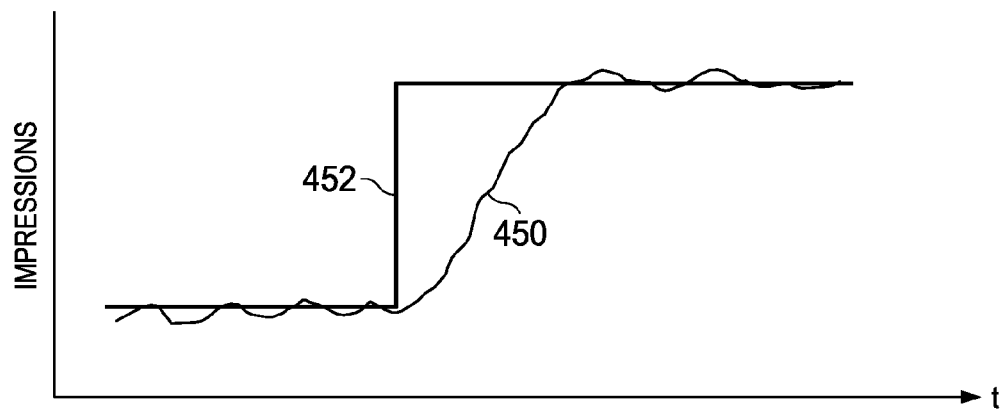
FIG. 10A illustrates an example of a time-lagged response provided by a PID control process.

FIG. 10A illustrates an example of the phenomenon discussed above. As shown, the dynamic response in the actual impressions served, indicated at 450, involves a time lag to before reaching the impression setpoint, indicated at 452, after a change in the setpoint.

Thus, in some embodiments, the target delivery profile (moving setpoint curve) is automatically modified by bidding system 20 (e.g., production system 32) such that the dynamic response to changes in the impression setpoint (defined by the target delivery profile), including the response time lag, is mathematically accounted for. For example, the target delivery profile may be modified such that changes in the impression setpoint are smoothed, and the magnitude of the setpoint change is increased to account for the response time lag.

As used herein, "smoothing" a change in the setpoint includes any manner of reducing the rate of change or abruptness associated with the setpoint change, e.g., by transforming an abrupt change (e.g., an instantaneous or square-wave-type change) into a curved transition, a linear sloped transition (having a non-zero duration), a stepped or otherwise incremental transition, or any other form of transition that decreases the rate of change or abruptness associated with the setpoint change.

Figure 10B:
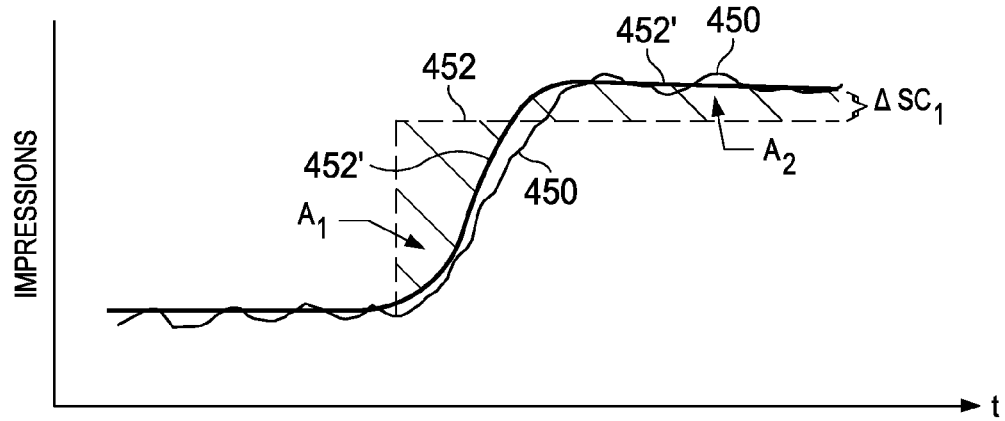
FIG. 10B illustrates a technique for smoothing a target delivery profile used by a PID controller, to account for time-lagged response, according to one embodiment.

FIG. 10B illustrates an example of such a modification to the target delivery profile 452 shown in FIG. 10A. The modified target delivery profile, indicated at 452', provides a smoothed transition for the setpoint change, and increases the magnitude of the of the setpoint change as compared with the original curve 452, indicated at $\Delta SC_1$. The PID control may provide a dynamic response that substantially follows the smoothed transition, such that the time lag between the actual response and the target delivery profile 452' is substantially reduced, as compared with the original target delivery profile 452. The modified target delivery profile 452' may be generated such that additional integrated area provided by the increased magnitude of the setpoint change, indicated as area $A_2$ is equal to the integrated area corresponding to the response time lag, indicated as area $A_1$. Thus, the total area under the modified target delivery profile 452' is equal to the total area under the original target delivery profile 452. Thus, assuming the dynamic response provided by the PID control can substantially follow the smoothed transition, the total number of actual impressions served may substantially match the total target number of impressions served (i.e., the area under the actual impression served curve may substantially match the area under the original target delivery profile 452).

Although FIG. 10B shows a smoothing of a setpoint increase, setpoint decreases may be smoothed in the same or similar manner.

Figure 10C:
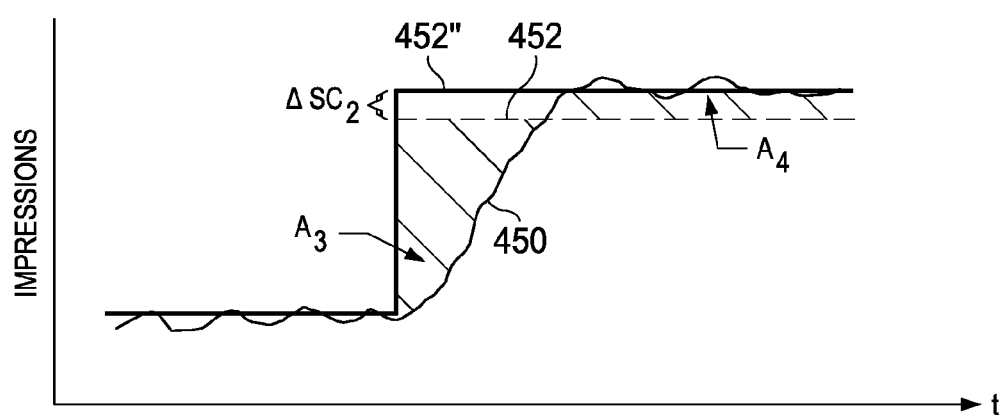
FIG. 10C illustrates another example modification of a target delivery profile used by a PID controller, to account for time-lagged response, according to one embodiment.

FIG. 10C illustrates another example modification to the target delivery profile 452, as an alternative to the modification shown in FIG. 10B. In this example, the magnitude of the setpoint change is increased, but the setpoint transition is not smoothed, resulting in the modified target delivery profile, indicated at 452". The extent to which the magnitude of the setpoint change is increased, $\Delta SC_2$, may be calculated such that expected additional integrated area provided by the increased magnitude of the setpoint change, indicated as area $A_4$ is equal to the expected integrated area corresponding to the expected response time lag, indicated as area $A_3$. The expected integrated areas $A_3$ and $A_4$ may be determined, e.g., based on historical data regarding time-lag responses to various setpoint changes.

Again, although FIG. 10C shows a modification of a setpoint increase, setpoint decreases may be modified in the same or similar manner (e.g., by increasing the magnitude of the setpoint decrease).

Bidding system 20 may modify the setpoint curve by executing a profile modification algorithm, e.g., to account for time lags associated with the actual advertisement purchase results caused by the operation of the control loop feedback algorithm, as discussed above. The profile modification algorithm may be programmed to modify the setpoint curve in any suitable manner, e.g., according to any suitable set of rules. For example, the profile modification algorithm may be configured to adjust one or more parameters of each setpoint change (referred to herein as "profile change parameters") defined in the setpoint profile based on any suitable data (referred to herein as "profile modification input data").

Profile change parameters for each setpoint change may include, e.g., a start time of the profile change, an end time of the profile change (which may be the same or different the begin time), a duration of the change, a pre-change value (e.g., impressions or impressions/time) at the start time of the change, a post-change value (e.g., impressions or impressions/time) at the end time of the change, a direction of the setpoint change (increase or decrease), a magnitude of the setpoint change, a rate or slope of the setpoint change, a time from the previous setpoint change defined by the setpoint profile, a time until the subsequent setpoint change defined by the setpoint profile, and/or any other parameter related to the setpoint change.

The profile modification algorithm may be programmed to modify any one or more of such profile change parameters in any defined manner based on any suitable profile modification input data. For example, profile modification input data may include data regarding the dynamic response in actual impressions served (e.g., curves 450 shown in FIGS. 10A-10C) resulting from different types of setpoint changes, e.g., where different types of setpoint change vary in magnitude, direction, or any combination of profile change parameters listed above. The dynamic response data may also be collected and stored as a function of one or more environmental parameters (e.g., current traffic conditions, volume of received bid requests, time of day, day of the week, geographic region, or any other environmental parameter), and/or as a function of one or more bidding system operational parameters (e.g., specific or current settings of PID controller 280, bidding server 30, dynamic pacing system 34, and/or production system 32).

The dynamic response data may be historical data loaded into or accessible by bidding system 30. Alternatively, bidding system 30 may collect such dynamic response data for the response of the feedback-loop control system (e.g., PID controller) over time for a number of ad campaigns implemented by bidding system 30. Thus, the profile modification algorithm may utilize dynamic response data collected from prior ad campaigns or prior periods of a current ad campaign to modify the setpoint profile for a current portion of a current ad campaign.

For example, to modify a particular setpoint change for a current ad campaign, the profile modification algorithm may identify historical dynamic response data corresponding to similar setpoint changes (e.g., sharing one or more common profile change parameters with the particular setpoint change), and modify the particular setpoint change based on such identified historical dynamic response data. For instance, the profile modification algorithm may determine an average of lost impression volume caused be the dynamic response lag (e.g., corresponding to integrated areas $A_1$ or $A_3$ shown in FIGS. 10B and 10C), calculate an increased magnitude to account for this lost impression volume (e.g., corresponding to magnitude increase $\Delta SC_1$ or $\Delta SC_2$ shown in FIGS. 10B and 10C), e.g., based on the known time until the subsequent setpoint change defined by the setpoint profile, and modify the setpoint profile accordingly.

As another example, the profile modification algorithm may generate mathematical algorithms for adjusting each setpoint change based on one or more profile change parameters of the respective setpoint change and based on the historical dynamic response data, and then simply apply the mathematical algorithms to modify each setpoint profile to be implemented by the bidding system 30.

In other embodiments, the profile modification algorithm may be programmed to modify the setpoint changes in a setpoint profile based (at least in part) on dynamic response data collected during the duration defined by the setpoint profile (e.g., one day), or in some embodiments, even during the dynamic response of the setpoint change to be modified or being modified, thereby providing real time or substantially real time control. For example, when a particular setpoint change of a currently-active setpoint profile is reached, the profile modification algorithm may monitor the dynamic response resulting from the feedback-loop control system (e.g., PID controller) and adjust one or more parameters of that setpoint change, e.g., the magnitude of the change, substantially in real-time. For example, with reference to FIG. 10C, the profile modification algorithm may monitor the actual impression data 450 for a predetermined period of time or until some predefined threshold event (e.g., 50% of the originally defined change magnitude is reached), and based on such monitored data, calculate or estimate the lost impression volume caused be the dynamic response lag (e.g., corresponding to integrated area $A_3$), calculate an increased magnitude to account for this lost impression volume (e.g., corresponding to magnitude increase $\Delta SC_2$), e.g., based on the known time until the subsequent setpoint change defined by the setpoint profile, and modify the setpoint profile accordingly.

It should be understood that the above are example embodiments only, and that the profile modification algorithm may modify each setpoint change of each setpoint profile in any other suitable manner.

Figure 11:
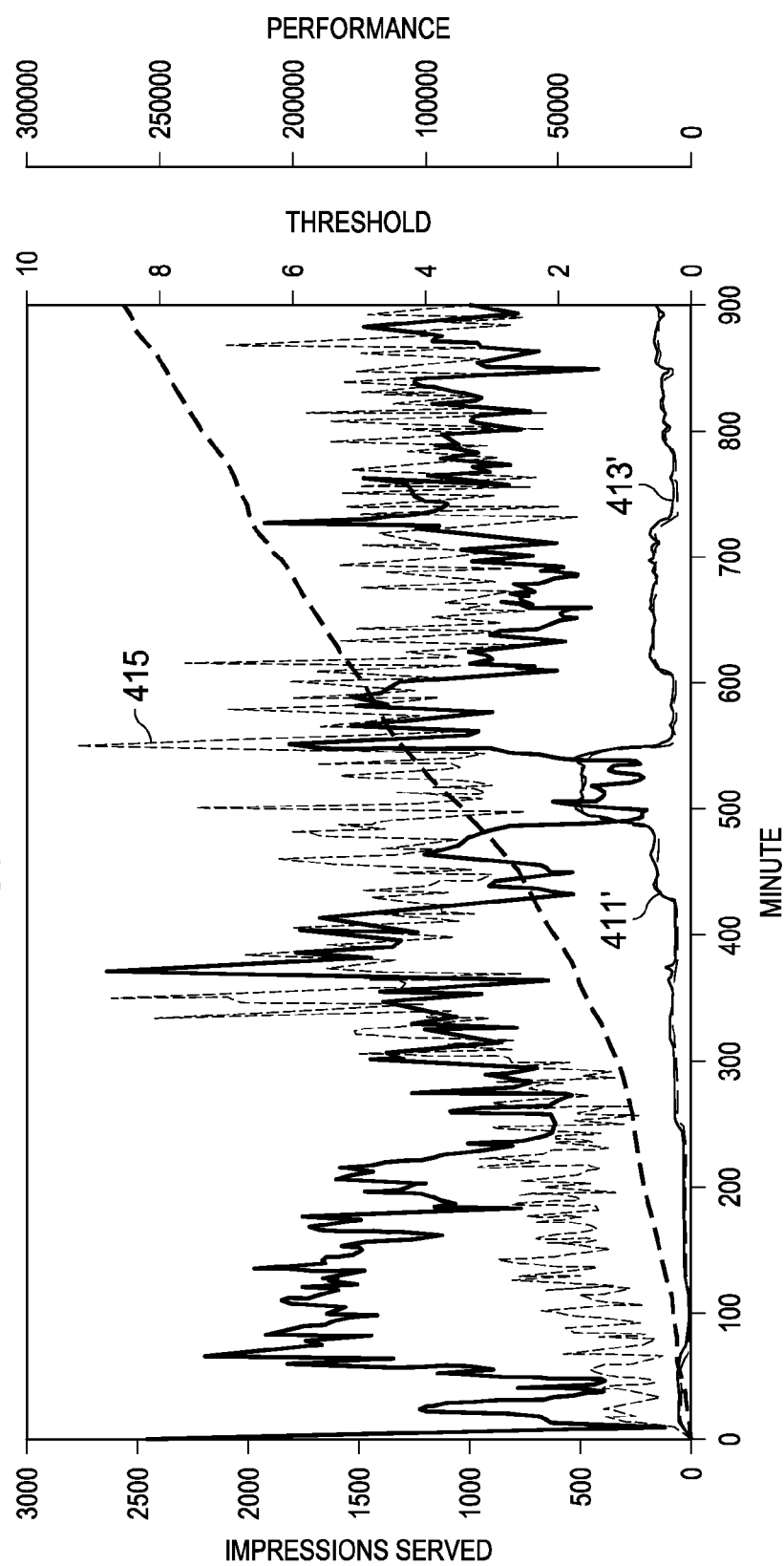
FIG. 11 illustrates a plot of example results of an example pacing control process incorporating a smoothed target delivery profile, according to one embodiment.

FIG. 11 illustrates an example implementation of the setpoint smoothing concepts discussed above with respect to FIG. 10B. In particular, FIG. 11 shows a plot similar to FIG. 9, but wherein a modified—in particular, smoothed—version of the target delivery profile 411 of FIG. 9, indicated in FIG. 11 as smoothed profile 411', is generated and fed into PID controller 280 of bidding system 20. As shown, smoothed target delivery profile 411' smoothes both the setpoint increases and the setpoint decreases of the original target delivery profile 411 shown in FIG. 11. Further, it is clear from FIG. 11 that the response provided by the PID control (i.e., by dynamically adjusting the pacing threshold value based on the moving setpoint, etc.), in the form of the actual impressions served indicated at line 413', tracks the smoothed target delivery profile 411' significantly more closely than with the non-smoothed target delivery profile 411 shown in FIG. 9, which may increase the overall performance of the campaign, e.g., with respect to one or more defined goals or metrics of the campaign.

Integral Windup

In some situations, the presence of numerical limits (minimum limit and maximum limit) on the pacing threshold value being dynamically adjusted by the PID controller causes a phenomenon referred to herein as "integral windup." For example, When a spike in available impressions occurs, i.e., a spike in bid requests received at bidding system 20, the PID controller may attempt to avoid an excessive spike in impressions purchased by rapidly increasing the pacing threshold value. However, the pacing threshold value is limited by its maximum value, e.g., 20, and thus bidding system may still purchase excessive impressions (as compared to the relevant setpoint) during the available impression spike, and the integral term (I) of the PID control may accumulate a significant error, or "wind up," due to the excess overshooting. Thus, when the number of available impressions drops, the PID controller takes some time to correct for the integral windup. In addition, as the integral term provides an offset that eliminates persistent bias or error over time, any error that the PID loop cannot correct for results in an accumulation of the integral term. One such source of error may be the intended limitation of adjustment of the pacing threshold as to limit movement for business purposes. The result of such limitation in the movement of the pacing threshold can also result in wind-up of the integral term.

In some embodiments, PID controller 280 may be configured to employ one or more reset techniques to reduce the effects of such integral windup. For example, PID controller 280 may employ an external reset, wherein the controller stops compounding the integral term when the pacing threshold value is adjusted to one of its limit values, e.g., 0 or 20. As another example, PID controller 280 may employ a back-calculation method that prevents intended limitations in the movement in the pacing threshold from causing integral windup. The back calculation of the integral term is the algebraic rearrangement of the PID algorithm as to assign the value to the integral term based on a known value of the threshold and the remaining terms of the controller. An example of such calculation is $K_I*\int(\text{error})=\text{Output}-K_P*(\text{error})-K_D*d(\text{error})/dt$. It should be understood that any other suitable algorithms and techniques may be used to reduce or eliminate integral windup.

Multi-Level or Cascade-Type Control

Managing the pacing of an online ad campaign (e.g., the rate at which impressions are won/purchased over the duration of the campaign) typically presents a variety of technical challenges, including, among others: (1) meeting an impression purchase target for the campaign, and (2) executing the implemented pacing algorithms with sufficient speed to account for rapid real-time changes in relevant online activity, e.g., to prevent fast over-pacing, which may occur due to a flood or spike in available impressions/bid requests occurring in real time, for example. Meeting the impression target is a lower frequency problem and thus may not require fast action by the PID control loop. However, preventing fast over-pacing is a higher frequency problem and thus may particularly benefit from a fast, essentially real-time response by the PID control loop.

In some embodiments, the PID controller is configured as a multi-level or multi-stage controller, e.g., employing general or specific concepts of a cascade controller. Cascade control allows for a decomposition of the PID control loop into a high frequency component and a low frequency component. In addition, cascade control may allow for a more distributed execution with a redundancy of measurement that may result in more intelligent bidding.

Figure 12:
FIG. 12 illustrates an example multi-level, or "cascade," PID control scheme implemented by a PID controller, according to one embodiment.

FIG. 12 illustrates an example multi-level, or "cascade," PID control scheme 460 implemented by PID controller 280, according to one embodiment. As shown, PID control scheme 460 may include an outer control loop 452 and an inner control loop 454. The outer control loop 452 takes in a target number of impressions purchased (setpoint) and an actual number of impressions purchased and outputs a bid volume setpoint, which feeds into the inner control loop 454. The bid volume setpoint represents a target number of bids to be submitted by the bidding system during the relevant time segment that is expected to result in the target number of impressions purchased (defined by the target delivery profile).

The inner control loop 454 receives, in addition to the bid volume setpoint from the outer control loop 454, an actual bid volume (i.e., number of bids placed during the relevant time period) detected by bidding system 20 or ad servers serving purchased impressions, and outputs a pacing threshold value. The inner control loop 454 is designed to quickly adjust to changes in bid volume, to prevent over-pacing. Thus, the inner control loop 454 executes at a higher frequency/faster pace than the outer PID loop 452. For example, the frequency of execution of inner control loop 454 may be at least 2 times, at least 3 times, at least 5 times, at least 10 times, at least 20 times, at least 50 times, or at least 100 times the frequency of execution of outer control loop 452. For example, in an embodiment in which outer control loop 452 executes once per minute, inner control loop 454 may execute every 15 seconds, every ten seconds, every five seconds, every three seconds, or every second, for example.

In some embodiments, the outer control loop 452 comprises a proportional-integral-derivative (PID) type algorithm (e.g., PID, PI, PD, or P type control), and the inner control loop 454 comprises any control algorithm suitable to make adjustment decisions regarding the pacing threshold at a faster rate than the outer loop 452. For example, the control algorithm of the inner control loop 454 may utilize a PID, PI, PD, or P type control algorithm, or alternatively any suitable custom control logic that receives the output of the outer loop 452 (bid volume setpoint) and outputs adjustments to a pacing threshold at a faster rate than the logic of the outer control loop 452 could.

In certain embodiments, PID control scheme 460 is implemented by PID controller 280 and utilizes PID control for both outer control loop 452 and inner control loop 454. In other embodiments, one or both of outer control loop 452 and inner control loop 454 may be a proportional-integral (PI) control loop, a proportional-derivative (PD) control loop, or a proportional-only (P) control loop, and may be the same type of control loop (e.g., both PID control loops, both PI control loops, both PD control loops) or may be different types of control loops (e.g., one PID control loop and one PI control loop, or one PI control loop and one P control loop). In one example embodiment, outer control loop 452 provides proportional-integral (PI) control and inner control loop 454 provides proportional-only (P) control. This may be advantageous, e.g., to allow implementation of simpler control loops and/or to provide faster execution to allow high frequency processing suitable for addressing the high frequency problem occurring in real-time (e.g., a sudden spike in bid requests). For example, proportional-only (P) control is an extremely efficient and real-time algorithm. Thus, it should be understood that the label "PID control" in the figures is intended to refer to any of the above-mentioned control loop algorithms (e.g., a P, PI, PD, or PID control algorithm).

Figure 13:
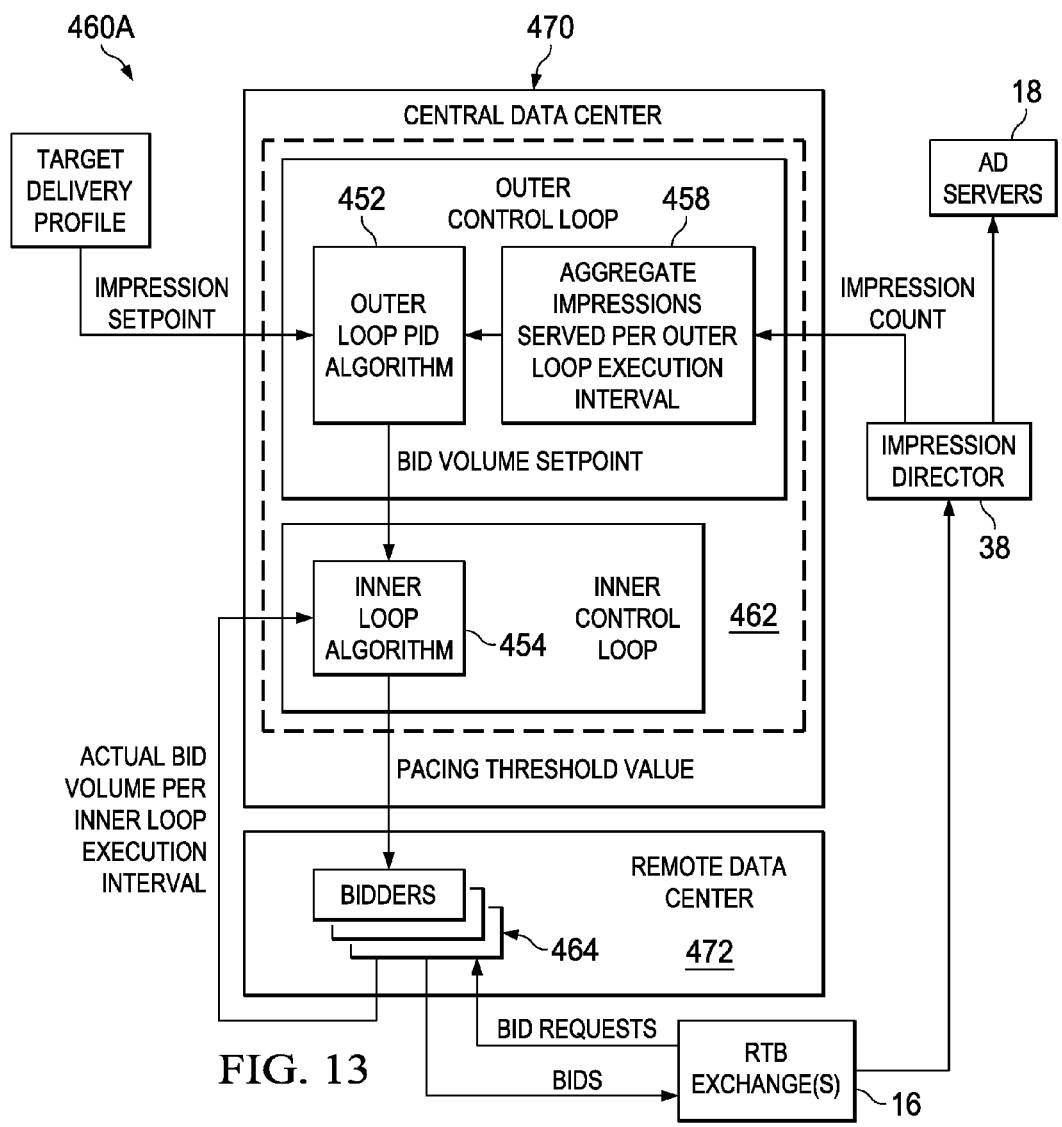
FIG. 13 shows an example of a multi-level, or "cascade," PID control scheme in which both control loops and are executed together at a central location, according to one embodiment.

FIG. 13 shows an example of a multi-level (cascade) control configuration 460A for a particular campaign, according to a first embodiment. In the example control configuration 460A, both control loops 452 and 454 are executed together at a central location, e.g., at a real-time controller 462 located at a central data center 470, while the bidder(s) 464 that interact directly with the RTB exchange(s) 16 are located in a remote data center 472. In this configuration, one inner control loop 454 is provided per outer control loop 452, the pacing threshold value output by the centralized controller 462 is sent to the bidders 464, which record and feed the actual bid volume (i.e., number of bids placed during the relevant time period) back to the inner control loop 454.

The outer loop 452 and inner loop 454 execute at the central data center 470 to generate and send a pacing threshold value (e.g., per running campaign) to the remote data center 472 in which the bidders 464 operate to receive and process bid requests from RTB exchange servers 16. The outer loop 452 may operate at an execution interval equal to the interval of the time segment defined by the target delivery profile, e.g., one minute, while the faster inner control loop 454 may operate at a shorter execution interval, e.g., one second, as discussed above. As shown, the impression setpoint defined by the currently active target delivery profile for the relevant (next) time segment is sent to the outer control loop 452. The outer control loop 452 also receives a count of actual impressions served (i.e., purchased by the bidding system for the relevant campaign), which may be an aggregated count from one or more impression directors 38 of bidding system 20 over the most recent outer loop execution interval (one minute), as indicated by algorithm step 458.

As discussed above regarding FIG. 1, for each bid submitted by bidding system 20 (from any bidder 464 of bidding system 20) that wins the respective auction at RTB exchange server 16, the RTB exchange server 16 notifies an impression director 38 of bidding system 20 (via a URL of the impression director 38 included in the submitted bid), which then directs the appropriate ad server 18 (e.g., a third party ad server) to serve the appropriate ad to the webpage being loaded. Thus, impression director 38 notifies the outer control loop of each impression served (i.e., each winning bid) or sends the outer control loop a batched count of impressions served at a defined frequency (e.g., every second), or alternatively may perform the function of step 458 and send the outer control loop a batched count of impressions served at the frequency of the outer control loop execution (e.g., once per minute).

The outer loop 452 executes a PID algorithm (e.g., a PI algorithm) to output the target number of bids (bid volume setpoint) calculated (estimated) to meet the required impression goal for the time segment (one minute) until the next execution of the outer loop 452. Thus, the output of the outer loop 452 is defined by the input process variable to the inner loop 454.

The inner loop 454 executes much faster, e.g., every second, and responds to the actual volume of placed bids (at the inner loop execution interval) being communicated from the bidders 464 in the remote data center 472 by adjusting the pacing threshold value. In some embodiments, the central data center 470 and remote data center 472 are connected via an intranet, private network, or other reliable connection to ensure fast and reliable execution of the multi-level control algorithm.

In some embodiments, the bidders 464 are the actual computers that receive the bid requests from the RTB exchanges 16, decide whether to bid based on the pacing threshold (along with other input, e.g., bid score), and price and place bids accordingly. Bidders 464 may exist in one or more remote data centers 472. According to the embodiment shown in FIG. 13, the bidders 464 receive the dynamically adjusted pacing threshold from the inner loop 454 at the rate the inner loop executes (in this example, one second intervals) and apply the dynamically adjusted pacing threshold to incoming bid requests in real-time. The bidders 464 output the actual bids placed volume, also at the inner loop execution interval (one second), to the inner loop 454, which uses the actual bids placed volume as an input for the subsequent execution instance.

In the illustrated example, the outer loop 452 comprises a PID feedback control loop, executing at the rate of once per minute, that receives as inputs (a) the per-minute aggregate impression count and (b) the per-minute impression setpoint, and outputs a bid volume setpoint corresponding to the impression setpoint. The inner loop 454 executes once per second and reacts to the number of actual bids placed by calculating and modulating/adjusting the pacing threshold value to maintain the rate indicated by the output of the outer loop 452. The bidders 464, executing in real-time, receive every bid from the RTB exchange(s) 16, apply the pacing threshold value most recently received from the inner loop 454 (i.e., within the last second), determine whether to bid on each bid request, and generate and send bids to the respective RTB exchange(s) 16.

The concept is that the outer loop 452 outputs a bid volume setpoint that is estimated to meet the required number of impressions purchased as defined by the target delivery profile for that time segment (e.g., minute). The inner loop 454 makes final adjustments to the pacing threshold value with the goal of hitting the target number of impressions purchased, and sends the pacing threshold adjustments to the bidders 464. Thus, the number of bids submitted by the bidders 464 is used by the inner loop 454 as a proxy for the count of impressions purchased. For example, if number of submitted bids spikes during a particular minute, it is assumed that the number of impressions purchased will also increase accordingly, and thus the inner loop 454 raises the pacing threshold value to decrease the biding rate and therefore the purchasing rate.

In addition to allowing faster adjustments of the pacing threshold, the multi-level or multi-loop control of the pacing threshold allows the option of moving the inner control loop 454 closer to the bidders 464 in the RTB environment, which may allow for more intelligent decisions made further into the RTB funnel.

Figure 14:
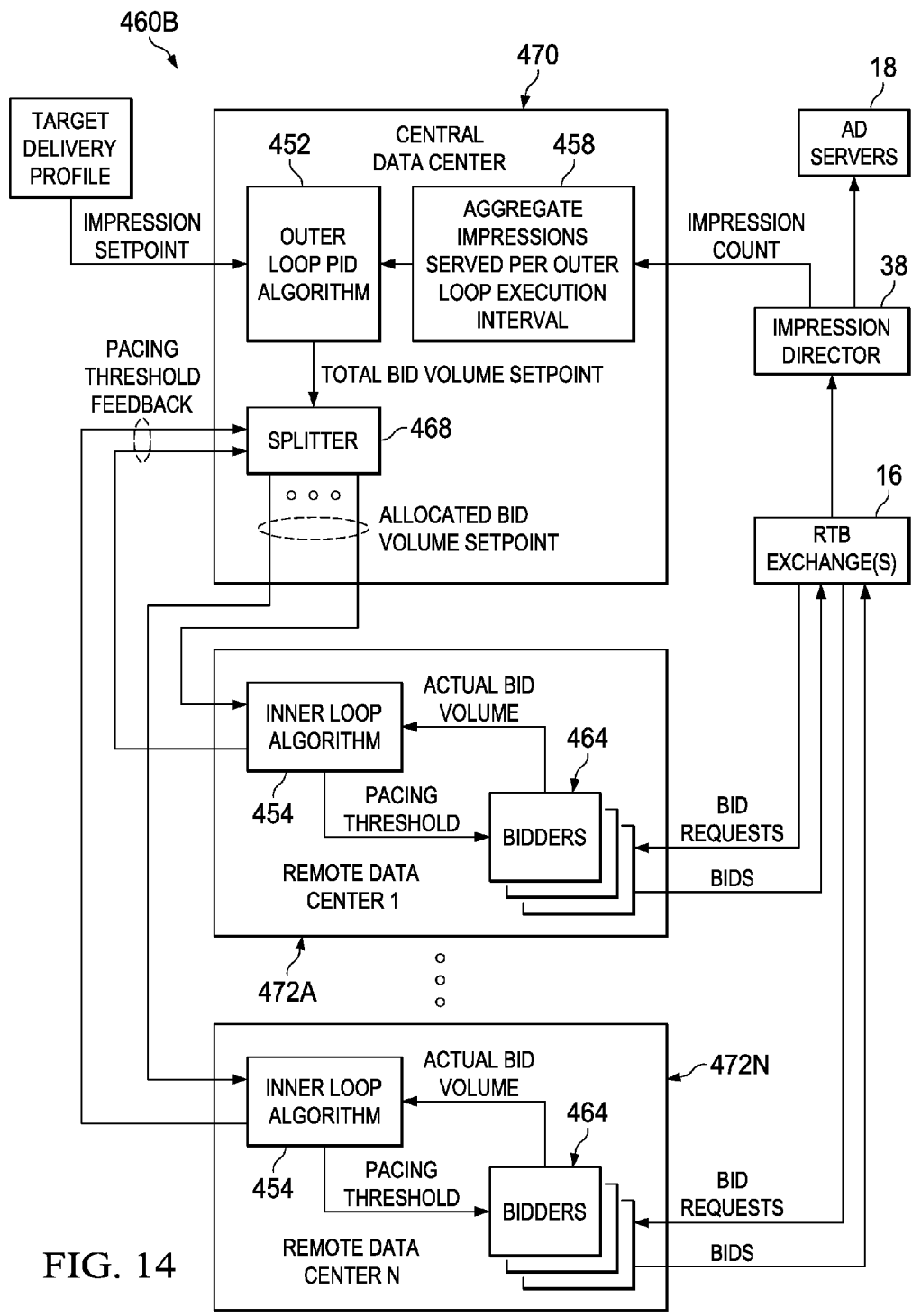
FIG. 14 shows an example of a multi-level, or "cascade," PID control scheme in which the outer control loop and inner control loop are executed at different locations, according to one embodiment.

FIG. 14 shows an example of a multi-level (cascade) control configuration 460B for a particular campaign in which the outer control loop 452 is executed at a central location, e.g., at a real-time controller located at a central data center 470, and the inner control loop 454 executes at a location or locations local to the bidders 464, e.g., one or more data centers 472 remote from the central data center.

In the illustrated example, the inner control loop 454 is distributed across a plurality of data centers 472 remote from the central data center, such that each data center 472 executes a respective inner control loop 454 and outputs a respective pacing threshold value to one or more bidders 464 at that data center 472. Thus, each data center 472 is allocated a target volume of bids to place for the particular campaign. To provide this allocation, a splitter 468 may be provided to split a total bid volume setpoint output by the outer loop 452 between the plurality of data center 472, such that each data center 472 is allocated a portion of the total bid volume setpoint, which allocated bid volume setpoint is fed to the inner loop algorithm 454 of the respective data center 472.

The splitter 468 may utilize any suitable rules or algorithms for allocating the total bid volume setpoint output by the outer loop 452 to the plurality of data center 472. For example, the splitter 468 may allocate the total bid volume setpoint based on the current pacing threshold value fed back from each respective inner loop 454. The splitter 468 may be programmed to balance the pacing threshold across all data centers 472. Thus, if one data center 472 currently has a low pacing threshold (as compared to the other data centers 472), it may indicate that that data center 472 is having difficulty winning impressions. Thus, the splitter 468 is programmed to allocate less bid volume to that remote data center 472, thereby resulting in an increase in the pacing threshold value for that remote data center 472. Conversely, if a data center 472 has a relatively high pacing threshold, the splitter 468 allocates more bid volume to that remote data center 472.

Each inner loop 454 may operate in a similar manner as described above regarding the embodiment of FIG. 13, except for operating based on the bid volume setpoint allocated to the respective data center 472, rather than the total bid volume setpoint for the campaign. Each inner loop 454 can execute fast to react to changes in bid volume as it resides in the same data center 472 as the bidders 454 that it controls.

Thus, in the illustrated example, the outer loop 452 comprises a PID feedback control loop, executing at the rate of once per minute, that receives as inputs (a) the per-minute aggregate impression count and (b) the per-minute impression setpoint, and outputs a total bid volume setpoint for the campaign. The splitter 468 takes the total bid volume setpoint from the outer loop 452 and splits it up between the remote data centers 472. The splitter intends to balance the pacing thresholds for each campaign across the data centers 472, as discussed above.

There is one inner loop 454 per campaign executing on a machine in each remote data center 472, at a rate of once per second. The inner loop 454 modulates the pacing threshold to attempt to match the allocated bid volume setpoint as specified by the splitter for that data center 472. The pacing threshold value is communicated back to the splitter at a regular frequency (e.g., every 5 seconds), and the splitter uses the pacing threshold values received from the inner loops 454 of the data centers 472 as input to reallocate the bid volume setpoint for each data center 472.

Another potential advantage of this configuration is that each remote data center 472 may include logic to execute the respective inner control loops 454 during a temporary communication outage with the central data center 470.

Figure 15:
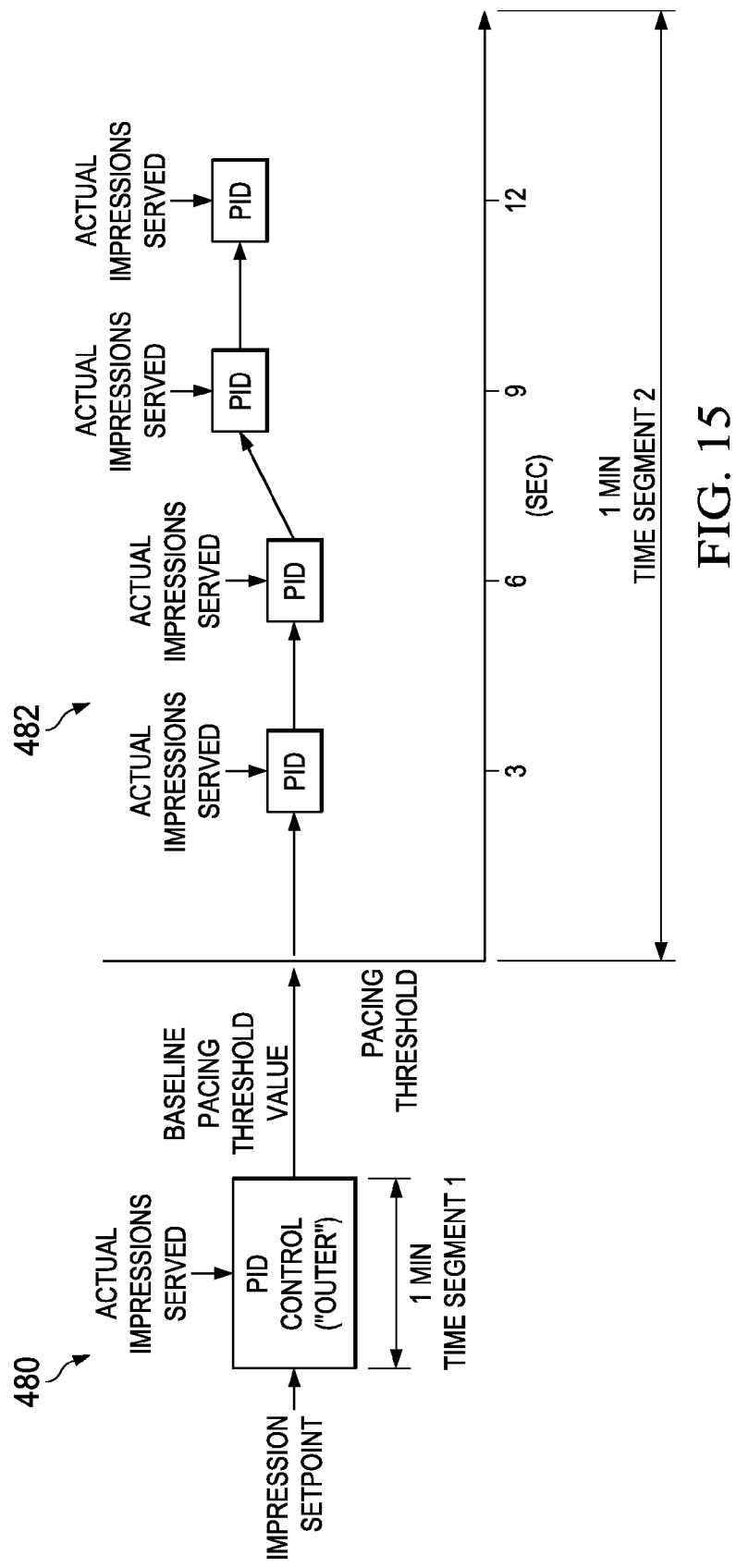
FIG. 15 illustrates another example embodiment of a multi-level PID control scheme, according to one embodiment.

FIG. 15 illustrates another example embodiment of a multi-level or multi-stage PID control 480 implemented by the disclosed system. The PID control 480 is split into an outer control loop 482 and an inner control loop 484. The outer control loop 482 may operate similar to the PID control loop shown in FIG. 6, to determine a pacing threshold value once each time segment (e.g., every one minute). The inner control loop 484 may be executed with within each time segment to provide higher frequency control of the pacing threshold value, e.g., to handle a sudden flood of bid requests/available impressions. For example, the frequency of execution of inner control loop 484 may be at least 2 times, at least 3 times, at least 5 times, at least 10 times, at least 20 times, or at least 50 times the frequency of execution of outer control loop 482. For example, where outer control loop 482 executes once per minute, inner control loop 484 may execute every 15 seconds, every ten seconds, every five seconds, every three seconds, every second, or for example.

Inner control loop 484 may be designed to make higher frequency adjustments to the pacing threshold value output by the outer control loop 482. An example control process is as follows. The outer control loop 482 outputs a pacing threshold value for a particular time segment (e.g., one minute), which is implemented in real time for bidding decisions. The inner control loop 484 sets the pacing threshold value output by the outer control loop 482 as a baseline value and makes high frequency (e.g., every three seconds) adjustment decisions to the baseline threshold value (e.g., adjust or maintain the value) during the particular time segment, which adjustments are implemented in real time for bidding decisions. Each high frequency adjustment decision by the inner control loop 484 may use as inputs (a) a pro rata value of the impression setpoint (e.g., 1/X of the time-segment-specific impression setpoint where inner control loop 484 makes X high frequency adjustment decisions per time segment), (b) the number of actual impressions served during the previous high frequency time period (e.g., three seconds), and/or (c) the accumulated number of impression served since the last execution of the outer loop. The outer control loop 482 continues to execute and outputs a new pacing threshold value for the next time segment, which is implemented in real time and set as the new baseline value for the inner control loop 484, and the process continues.

In some embodiments, the inner control loop 484 is programmed to allow the threshold value to increase, but not decrease. For example, the inner control loop 484 may be programmed to allow the threshold value to increase, but not decrease, at each adjustment decision (e.g., every three seconds). As another example, the inner control loop 484 sets the pacing threshold value output by the outer control loop 482 as a minimum baseline value and allows the threshold value to increase or decrease at each adjustment decision (e.g., every three seconds), but not to decrease below the minimum baseline value.

Figure 16:
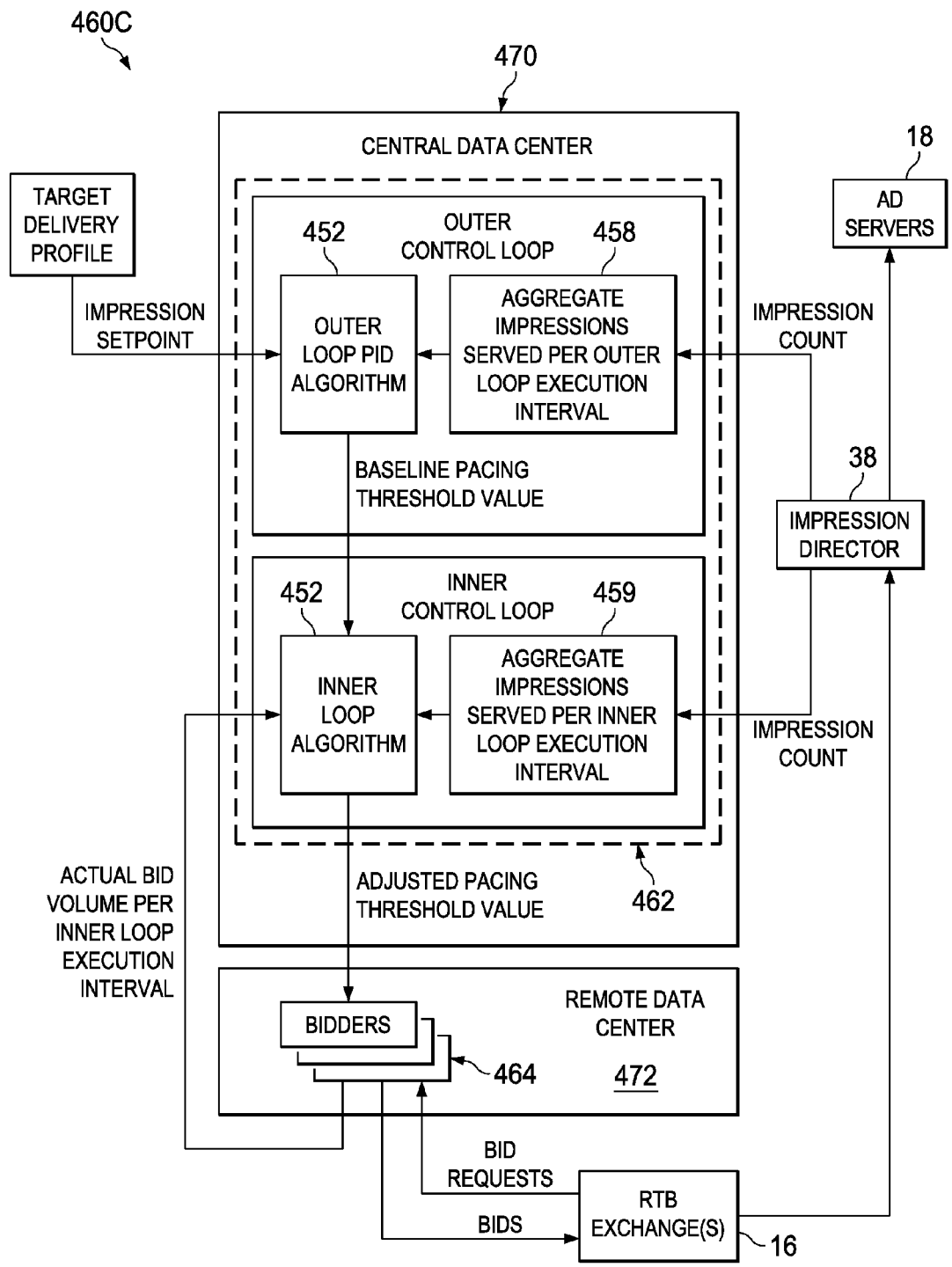
FIG. 16 illustrates a particular configuration of a multi-level PID control system incorporating concepts of the control scheme shown in FIG. 15, according to one embodiment.

FIG. 16 illustrates a particular configuration 460C of a multi-level or multi-stage PID control 480 that incorporates the concepts discussed above regarding FIG. 15. This configuration is similar to the embodiment of FIG. 13, except that the inner loop 454 receives impressions served counts from impression director(s) 18, and uses impressions served counts as input for determining adjustments to the pacing threshold value. That is, impression count updates are received from the impression director(s) 18 at the rate in which the inner loop executes (e.g., every second). These impression counts are also aggregated (summed) over the outer loop execution interval (e.g. one minute) and supplied to the outer loop 454 as input, e.g., as discussed above with the embodiment of FIG. 13. The outer loop 452 executes at a slower interval (e.g., once per minute) and outputs a baseline (e.g., minimum) pacing threshold to be used for the next outer loop execution period. The inner loop 454 may include any suitable control algorithm. For example, the inner loop 454 may comprise a PID control or an over-pacing control that raises the pacing threshold value if too many impressions are being purchased, but does not lower the pacing threshold value if too few impressions are being purchased. Alternatively, the inner loop 454 may both raise and lower the pacing threshold value based on the number of impressions being served (as indicated by the feedback from impression director(s) 18. Thus, the outer loop 452 determines a baseline (e.g., minimum) pacing threshold value and the inner loop 454 determines adjustments to the baseline value.

In some embodiments, if the inner loop 454 adjusts the pacing threshold value upward, the system estimate the number of impressions that would have been purchased without the adjustment to the pacing threshold, and sends this value to the outer loop 452, such that the outer loop 452 can execute with the correct number of impressions. In one embodiment, this estimate is calculated as part of step 458, by calculating the rate of impressions served during a period before the increase of the threshold value and extrapolating that rate to the entire time period of the outer loop. This step may be performed, for example, in embodiments in which the outer loop 452 uses, as an input, the number of impressions that were served at the output level of the previous execution period.

As discussed above, the PID control utilized by bidding system 20 may incorporate any known PID controller concepts. Thus, in some embodiments, the PID control utilized by dynamic pacing system 34 does not define the output explicitly, but rather comprises a simple feedback loop. In its most common form, a PID controller increases the output if the process value (PV) is less than the relevant setpoint (SP) and decreases the output if the PV is greater than the SP. This continues to occur until the PID finds the level in which the PV equals the SP. Thus, no explicit definition is made of the scale or meaning of the output in the algorithm itself. The fundamental assumption is that the PV will go up if the output goes up and vice-versa. However, in the example embodiments discussed below with respect to PID control of the pacing threshold value, the implemented PID control reverses the conventional operation, such that the PV increase when the output decreases. This is also a known, common configuration of a PID controller, as would be known by one of ordinary skill in the art.

In the example configuration 460A shown in FIG. 13, the outer loop PID 452 will find appropriate output value to feed to the inner loop 454 that will result in the desired volume of impressions served per the outer loop execution period. The inner loop 454 takes the output from the outer loop 452 as a SP and finds the pacing threshold value that results in number of submitted bids that matches the output of the outer loop 452. Thus, working backwards, the output of the outer loop 452 is interpreted to be the bid volume per inner loop execution period.

Alternatively, in the example configuration 460C shown in FIG. 16, the outer loop PID 452 determines the pacing threshold value that will result in the desired number of impressions served for the outer loop execution interval. The output of the outer loop 452 is defined by the particular algorithm used for the inner loop 454 and what the inner loop 454 takes for an input. Configuration 460C defines the input to the inner loop 454 as impression counts per inner loop execution. One embodiment of configuration 460C uses a PID loop for the inner loop 454, and the output of the outer loop 452 is the number of impressions per second (the execution interval of the inner loop 454) required to meet the target number of impressions served per minute (the execution interval of the outer loop 452). This is one embodiment that we have covered, but a less useful one as it does very little more than just having a faster outer loop and no inner loop at all.

In another embodiment of configuration 460C, the inner loop 454 is not a PID but rather a simple counter algorithm. In this embodiment, the inner loop 454 counts the number of impressions served since the last execution of the outer loop 452. If the number of impressions served exceeds the target number of impressions for the outer loop execution period (the outer loop SP), then the inner loop 454 raises the pacing threshold value. If the inner loop 454 detects the number of impressions served exceeds twice (or any other selected ratio) the target number of impressions for the outer loop execution period, then the inner loop 454 raises the threshold value again. In that sense, the outer loop PID 452 defines the minimum (baseline) pacing threshold value for the next minute and the inner loop 454 monitors the number of impressions served at a faster rate and adjusts the pacing threshold value upward at each multiple of the target number of impressions for the outer loop execution period (one minute). The algorithm adjusts the threshold value upward, but not so much as to effectively cut off bidding. In some embodiments, the controller is programmed to allow short-term over-purchasing of impressions (as compared with the target purchasing rate) as long as "high quality" impressions (per any suitable metric) are being purchased. Thus, the inner loop 454 may include a parameter that defines the number of increments from the current threshold to the highest value possible. This parameter defines the number of multiples of the desired number of impressions the system is permitted to serve before bidding is cut off all together. However, it should be understood that this is merely one example embodiment.

Thus, the pacing system may be programmed to allow over-purchasing of impressions in the short term in order to increase or maximize overall bid quality. That is, a unique challenge in the real-time bidding environment is to determine how to bid on the highest quality bids over the course of a campaign. In the context of pacing control, the challenge or goal it to bid on the highest valued requests while still serving the target (typically contracted) number of impressions by the end of the campaign. Thus, the system is programmed to allocate the number of impressions served per time period according to the target delivery profile in order to increase or maximize bid quality. However, it has been determined that in the short term, there is an advantage to deviating from the target delivery profile if the quality of the requests is high enough. Thus, the multi-loop feedback control, in particular the inner loop, as described herein, is designed to optimize purchasing in view of these specific goals.

Figure 17:
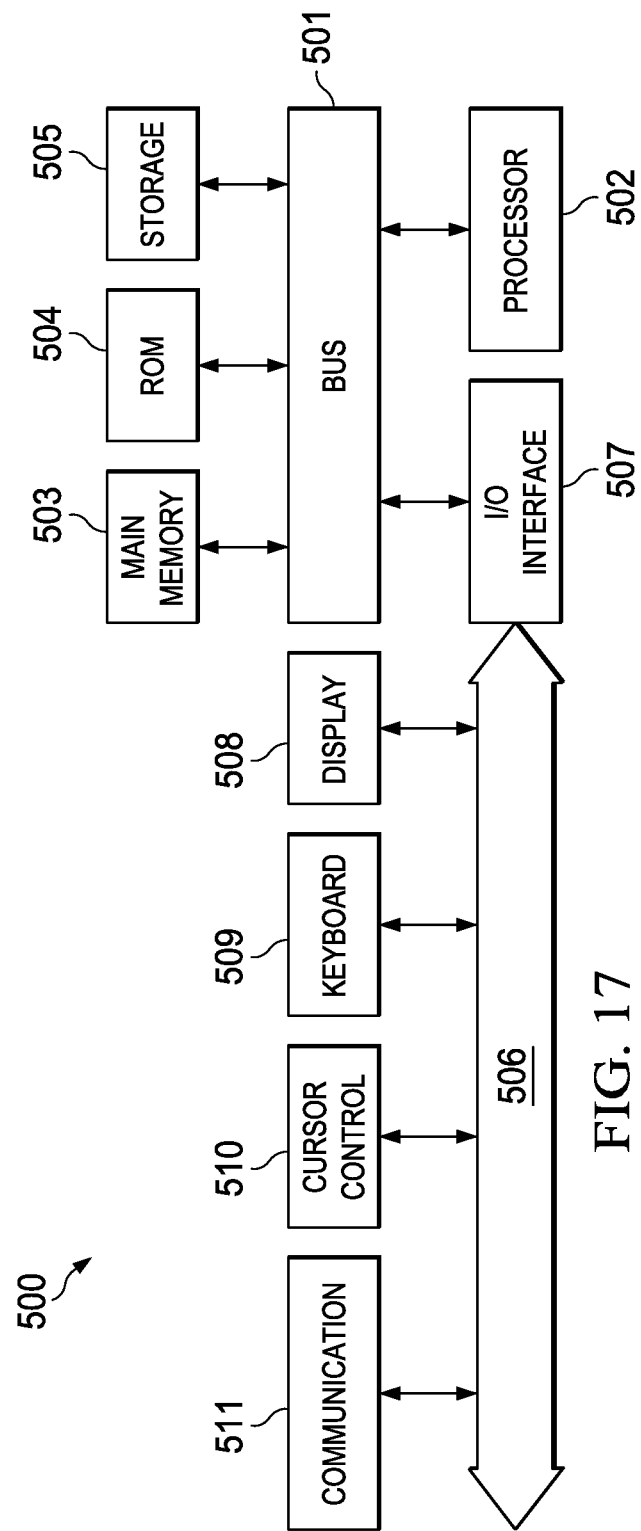
FIG. 17 illustrates an example computer architecture that may be used for embodiments of the present system.

FIG. 17 illustrates an example computer architecture that may be used for the present system, according to one embodiment. The example computer architecture may be used for implementing one or more components described in the present disclosure including, but not limited to, the present system. One embodiment of architecture 500 includes a system bus 501 for communicating information, and a processor 502 coupled to bus 501 for processing information. Architecture 500 further includes a random access memory (RAM) or other dynamic storage device 503 (referred to herein as main memory), coupled to bus 501 for storing information and instructions to be executed by processor 502. Main memory 503 also may be used for storing temporary variables or other intermediate information during execution of instructions by processor 502. Architecture 500 may also include a read only memory (ROM) and/or other static storage device 504 coupled to bus 501 for storing static information and instructions used by processor 502.

A data storage device 505 such as a magnetic disk or optical disc and its corresponding drive may also be coupled to architecture 500 for storing information and instructions. Architecture 500 can also be coupled to a second I/O bus 506 via an I/O interface 507. A plurality of I/O devices may be coupled to I/O bus 506, including a display device 508, an input device (e.g., an alphanumeric input device 509 and/or a cursor control device 510).

The communication device 511 allows for access to other computers (e.g., servers or clients) via a network. The communication device 511 may include one or more modems, network interface cards, wireless network interfaces or other interface devices, such as those used for coupling to Ethernet, token ring, or other types of networks.

The above example embodiments have been described herein above to illustrate various embodiments of implementing a system and method for estimating an advertisement impression volume. Various modifications and departures from the disclosed example embodiments will occur to those having ordinary skill in the art. The subject matter that is intended to be within the scope of the present disclosure is set forth in the following claims.

PID Controller Concepts

As discussed above, the PID control utilized by dynamic pacing system 34 may incorporate any or all of the concepts disclosed at http://en.wikipedia.org/wiki/PID_controller as of the date of filing of this application. These concepts are reproduced below, and with reference to FIGS. 18A-18E.

A proportional-integral-derivative controller (PID controller) is a control loop feedback mechanism (controller) widely used in industrial control systems. A PID controller calculates an error value as the difference between a measured process variable and a desired setpoint. The controller attempts to minimize the error by adjusting the process through use of a manipulated variable.

The PID controller algorithm involves three separate constant parameters, and is accordingly sometimes called three-term control: the proportional, the integral and derivative values, denoted P, I, and D. Simply put, these values can be interpreted in terms of time: P depends on the present error, I on the accumulation of past errors, and D is a prediction of future errors, based on current rate of change. The weighted sum of these three actions is used to adjust the process via a control element such as the position of a control valve, a damper, or the power supplied to a heating element.

Figure 18A:
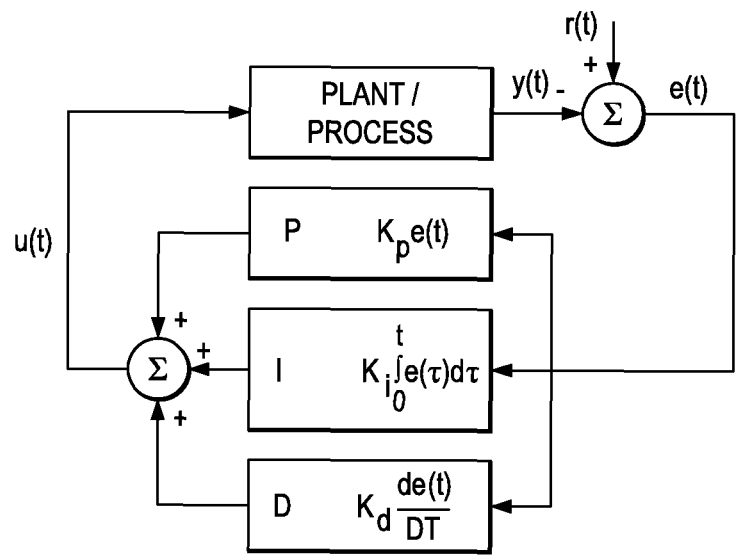
FIG. 18A shows a block diagram of a PID controller in a feedback loop.

FIG. 18A shows a block diagram of a PID controller in a feedback loop.

In the absence of knowledge of the underlying process, a PID controller has historically been considered to be the best controller. By tuning the three parameters in the PID controller algorithm, the controller can provide control action designed for specific process requirements. The response of the controller can be described in terms of the responsiveness of the controller to an error, the degree to which the controller overshoots the setpoint, and the degree of system oscillation. Note that the use of the PID algorithm for control does not guarantee optimal control of the system or system stability.

Some applications may require using only one or two actions to provide the appropriate system control. This is achieved by setting the other parameters to zero. A PID controller will be called a PI, PD, P or I controller in the absence of the respective control actions. PI controllers are fairly common, since derivative action is sensitive to measurement noise, whereas the absence of an integral term may prevent the system from reaching its target value due to the control action.

Control Loop Basics

A familiar example of a control loop is the action taken when adjusting hot and cold faucets to fill a container with water at a desired temperature by mixing hot and cold water. The person touches the water in the container as it fills to sense its temperature. Based on this feedback they perform a control action by adjusting the hot and cold faucets until the temperature stabilizes as desired.

The sensed water temperature is the process variable (PV). The desired temperature is called the setpoint (SP). The input to the process (the water valve position), and the output of the PID controller, is called the manipulated variable (MV) or the control variable (CV). The difference between the temperature measurement and the setpoint is the error (e) and quantifies whether the water in the container is too hot or too cold and by how much.

After measuring the temperature (PV), and then calculating the error, the controller decides how to set the tap position (MV). The obvious method is proportional control: the tap position is set in proportion to the current error. A more complex control may include derivative action. This considers the rate of temperature change also: adding extra hot water if the temperature is falling, and less on rising temperature. Finally integral action uses the average temperature in the past to detect whether the temperature of the container is settling out too low or too high and set the tap proportional to the past errors. An alternative formulation of integral action is to change the current tap position in steps proportional to the current error. Over time the steps add up (which is the discrete time equivalent to integration) the past errors.

Making a change that is too large when the error is small will lead to overshoot. If the controller were to repeatedly make changes that were too large and repeatedly overshoot the target, the output would oscillate around the setpoint in either a constant, growing, or decaying sinusoid. If the amplitude of the oscillations increase with time, the system is unstable. If they decrease, the system is stable. If the oscillations remain at a constant magnitude, the system is marginally stable.

In the interest of achieving a gradual convergence to the desired temperature (SP), the controller may damp the anticipated future oscillations by tempering its adjustments, or reducing the loop gain.

If a controller starts from a stable state with zero error (PV=SP), then further changes by the controller will be in response to changes in other measured or unmeasured inputs to the process that affect the process, and hence the PV. Variables that affect the process other than the MV are known as disturbances. Generally controllers are used to reject disturbances and to implement setpoint changes. Changes in feedwater temperature constitute a disturbance to the faucet temperature control process.

In theory, a controller can be used to control any process which has a measurable output (PV), a known ideal value for that output (SP) and an input to the process (MV) that will affect the relevant PV. Controllers are used in industry to regulate temperature, pressure, force, feed, flow rate, chemical composition, weight, position, speed and practically every other variable for which a measurement exists.

PID Controller Theory (for Parallel or Non-Interacting Forms of the PID Controller)

The PID control scheme is named after its three correcting terms, whose sum constitutes the manipulated variable (MV). The proportional, integral, and derivative terms are summed to calculate the output of the PID controller. Defining u(t) as the controller output, the final form of the PID algorithm is:

$$u(t) = MV(t) = K_p e(t) + K_i \int_0^t e(\tau)d\tau + K_d \frac{d}{dt}e(t) \quad (1)$$

where
$K_P$: Proportional gain, a tuning parameter
$K_i$: Integral gain, a tuning parameter
$K_d$: Derivative gain, a tuning parameter
e: Error=SP−PV
t: Time or instantaneous time (the present)
τ: Variable of integration; takes on values from time 0 to the present t.

Proportional Term:

The proportional term produces an output value that is proportional to the current error value. The proportional response can be adjusted by multiplying the error by a constant Kp, called the proportional gain constant.

The proportional term is given by:

$$P_{out} = K_p e(t) \quad (2)$$

A high proportional gain results in a large change in the output for a given change in the error. If the proportional gain is too high, the system can become unstable (see the section on loop tuning) In contrast, a small gain results in a small output response to a large input error, and a less responsive or less sensitive controller. If the proportional gain is too low, the control action may be too small when responding to system disturbances. Tuning theory and industrial practice indicate that the proportional term should contribute the bulk of the output change.

Figure 18E:
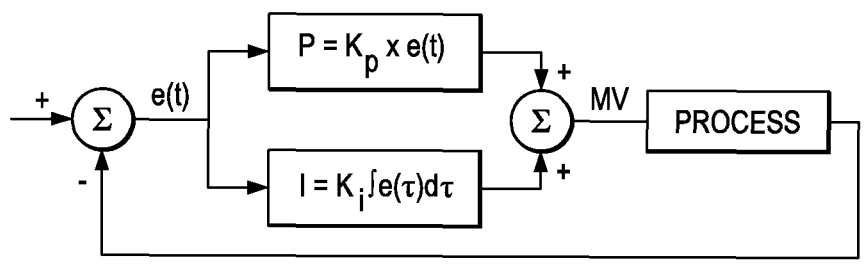
FIG. 18E shows a basic block diagram of a PI controller.
Figure 18B:
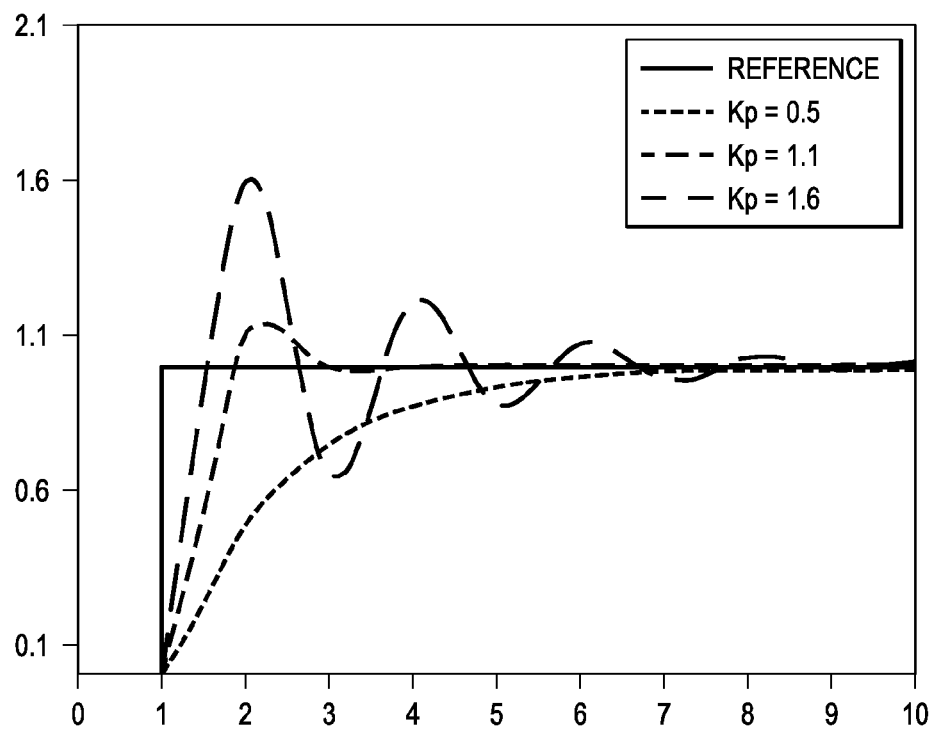
FIG. 18B is a plot of a PID controller output variable versus time, for three values of the proportional component ($K_p$)

FIG. 18B is a plot of output variable PV versus time, for three values of $K_p$ (with $K_i$ and $K_d$ held constant).

Droop

Because a non-zero error is required to drive it, a proportional controller generally operates with a steady-state error, referred to as droop or offset. Droop is proportional to the process gain and inversely proportional to proportional gain. Droop may be mitigated by adding a compensating bias term to the setpoint or output, or corrected dynamically by adding an integral term.

Integral Term

The contribution from the integral term is proportional to both the magnitude of the error and the duration of the error. The integral in a PID controller is the sum of the instantaneous error over time and gives the accumulated offset that should have been corrected previously. The accumulated error is then multiplied by the integral gain ($K_i$) and added to the controller output.

The integral term is given by:

$$I_{out} = K_i \int_0^t e(\tau)d\tau \quad (3)$$

The integral term accelerates the movement of the process towards setpoint and eliminates the residual steady-state error that occurs with a pure proportional controller. However, since the integral term responds to accumulated errors from the past, it can cause the present value to overshoot the setpoint value (see the section on loop tuning).

Figure 18C:
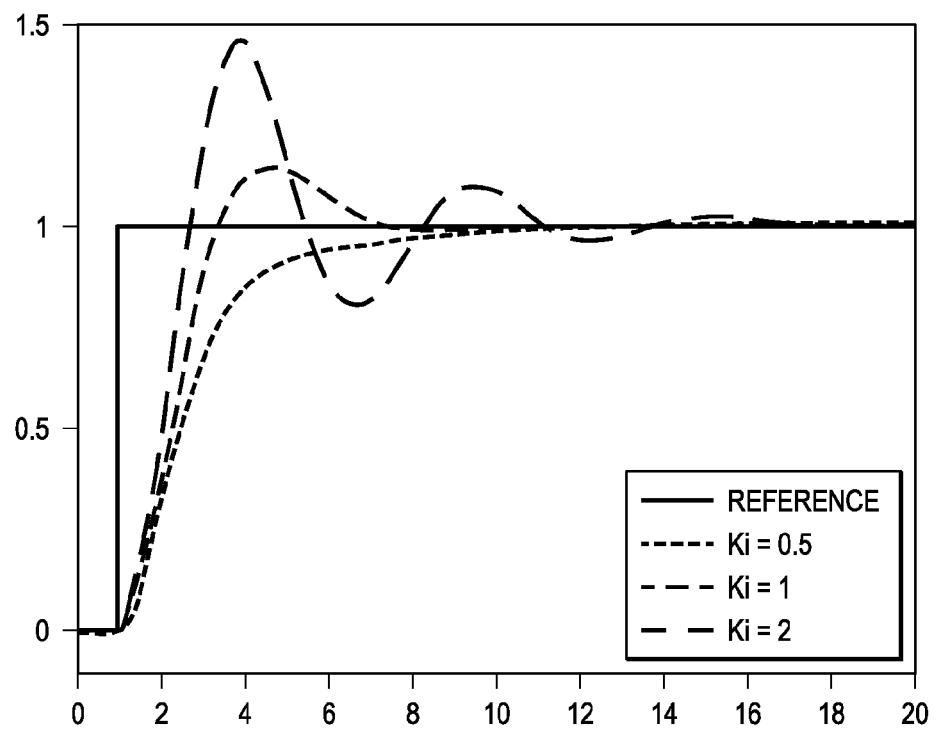
FIG. 18C is a plot of a PID controller output variable versus time, for three values of the integral component ($K_i$)

FIG. 18C is a plot of output variable PV versus time, for three values of $K_i$ (with $K_p$ and $K_d$ held constant).

Derivative Term

The derivative of the process error is calculated by determining the slope of the error over time and multiplying this rate of change by the derivative gain $K_d$. The magnitude of the contribution of the derivative term to the overall control action is termed the derivative gain, Kd.

The derivative term is given by:

$$D_{out} = K_d \frac{d}{dt}e(t) \quad (4)$$

Figure 18D:
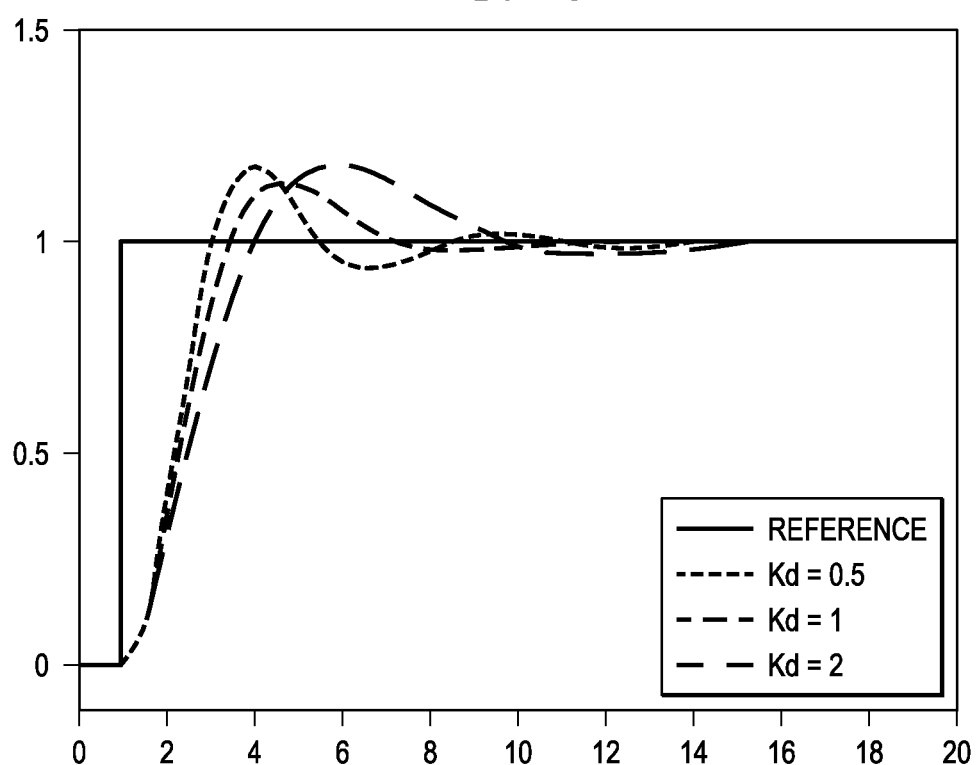
FIG. 18D is a plot of a PID controller output variable versus time, for three values of the derivative component ($K_d$)

Derivative action predicts system behavior and thus improves settling time and stability of the system. An ideal derivative is not causal, so that implementations of PID controllers include an additional low pass filtering for the derivative term, to limit the high frequency gain and noise. Derivative action is seldom used in practice though—by one estimate in only 20% of deployed controllers—because of its variable impact on system stability in real-world applications FIG. 18D is a plot of output variable PV versus time, for three values of $K_d$ (with $K_p$ and $K_i$ held constant).

Loop Tuning

Tuning a control loop is the adjustment of its control parameters (proportional band/gain, integral gain/reset, derivative gain/rate) to the optimum values for the desired control response. Stability (no unbounded oscillation) is a basic requirement, but beyond that, different systems have different behavior, different applications have different requirements, and requirements may conflict with one another.

PID tuning is a difficult problem, even though there are only three parameters and in principle is simple to describe, because it must satisfy complex criteria within the limitations of PID control. There are accordingly various methods for loop tuning, and more sophisticated techniques are the subject of patents; this section describes some traditional manual methods for loop tuning.

Designing and tuning a PID controller appears to be conceptually intuitive, but can be hard in practice, if multiple (and often conflicting) objectives such as short transient and high stability are to be achieved. PID controllers often provide acceptable control using default tunings, but performance can generally be improved by careful tuning, and performance may be unacceptable with poor tuning Usually, initial designs need to be adjusted repeatedly through computer simulations until the closed-loop system performs or compromises as desired.

Some processes have a degree of nonlinearity and so parameters that work well at full-load conditions don't work when the process is starting up from no-load; this can be corrected by gain scheduling (using different parameters in different operating regions).

Loop Tuning: Stability

If the PID controller parameters (the gains of the proportional, integral and derivative terms) are chosen incorrectly, the controlled process input can be unstable, i.e., its output diverges, with or without oscillation, and is limited only by saturation or mechanical breakage. Instability is caused by excess gain, particularly in the presence of significant lag.

Generally, stabilization of response is required and the process must not oscillate for any combination of process conditions and setpoints, though sometimes marginal stability (bounded oscillation) is acceptable or desired Loop Tuning: Optimum Behavior The optimum behavior on a process change or setpoint change varies depending on the application.

Two basic requirements are regulation (disturbance rejection—staying at a given setpoint) and command tracking (implementing setpoint changes)—these refer to how well the controlled variable tracks the desired value. Specific criteria for command tracking include rise time and settling time. Some processes must not allow an overshoot of the process variable beyond the setpoint if, for example, this would be unsafe. Other processes must minimize the energy expended in reaching a new setpoint.

Loop Tuning: Overview of Methods

There are several methods for tuning a PID loop. The most effective methods generally involve the development of some form of process model, then choosing P, I, and D based on the dynamic model parameters. Manual tuning methods can be relatively inefficient, particularly if the loops have response times on the order of minutes or longer.

The choice of method will depend largely on whether or not the loop can be taken "offline" for tuning, and on the response time of the system. If the system can be taken offline, the best tuning method often involves subjecting the system to a step change in input, measuring the output as a function of time, and using this response to determine the control parameters Loop Tuning: Manual Tuning If the system must remain online, one tuning method is to first set $K_i$ and $K_d$ values to zero. Increase the $K_p$ until the output of the loop oscillates, then the $K_p$ should be set to approximately half of that value for a "quarter amplitude decay" type response. Then increase $K_i$ until any offset is corrected in sufficient time for the process. However, too much $K_i$ will cause instability. Finally, increase $K_d$, if required, until the loop is acceptably quick to reach its reference after a load disturbance. However, too much $K_d$ will cause excessive response and overshoot. A fast PID loop tuning usually overshoots slightly to reach the setpoint more quickly; however, some systems cannot accept overshoot, in which case an over-damped closed-loop system is required, which will require a $K_p$ setting significantly less than half that of the $K_p$ setting that was causing oscillation.

TABLE 1

Effects of increasing a parameter independently

| Parameter | Rise time | Overshoot | Settling time | Steady-state error | Stability |
|---|---|---|---|---|---|
| $K_p$ | Decrease | Increase | Small change | Decrease | Degrade |
| $K_i$ | Decrease | Increase | Increase | Eliminate | Degrade |
| $K_d$ | Minor change | Decrease | Decrease | No effect in theory | Improve if $K_d$ small |

Loop Tuning: Ziegler-Nichols Method

Another heuristic tuning method is formally known as the Ziegler-Nichols method, introduced by John G. Ziegler and Nathaniel B. Nichols in the 1940s. As in the method above, the $K_i$ and $K_d$ gains are first set to zero. The proportional gain is increased until it reaches the ultimate gain, $K_u$, at which the output of the loop starts to oscillate. $K_u$ and the oscillation period $P_u$ are used to set the gains as shown:

TABLE 2

Ziegler-Nichols method

| Control Type | $K_p$ | $K_i$ | $K_d$ |
|---|---|---|---|
| P | $0.50K_u$ | — | — |
| PI | $0.45K_u$ | $1.2K_p/P_u$ | — |
| PID | $0.60K_u$ | $2K_p/P_u$ | $K_pP_u/8$ |

These gains apply to the ideal, parallel form of the PID controller. When applied to the standard PID form, the integral and derivative time parameters $T_i$ and $T_d$ are only dependent on the oscillation period $P_u$. Please see the section "Alternative nomenclature and PID forms".

PID Tuning Software

Most modern industrial facilities no longer tune loops using the manual calculation methods shown above. Instead, PID tuning and loop optimization software are used to ensure consistent results. These software packages will gather the data, develop process models, and suggest optimal tuning Some software packages can even develop tuning by gathering data from reference changes.

Mathematical PID loop tuning induces an impulse in the system, and then uses the controlled system's frequency response to design the PID loop values. In loops with response times of several minutes, mathematical loop tuning is recommended, because trial and error can take days just to find a stable set of loop values. Optimal values are harder to find. Some digital loop controllers offer a self-tuning feature in which very small setpoint changes are sent to the process, allowing the controller itself to calculate optimal tuning values.

Other formulas are available to tune the loop according to different performance criteria. Many patented formulas are now embedded within PID tuning software and hardware modules.

Advances in automated PID Loop Tuning software also deliver algorithms for tuning PID Loops in a dynamic or Non-Steady State (NSS) scenario. The software will model the dynamics of a process, through a disturbance, and calculate PID control parameters in response.

Limitations of PID Control

While PID controllers are applicable to many control problems, and often perform satisfactorily without any improvements or only coarse tuning, they can perform poorly in some applications, and do not in general provide optimal control. The fundamental difficulty with PID control is that it is a feedback system, with constant parameters, and no direct knowledge of the process, and thus overall performance is reactive and a compromise. While PID control is the best controller in an observer without a model of the process, better performance can be obtained by overtly modeling the actor of the process without resorting to an observer.

PID controllers, when used alone, can give poor performance when the PID loop gains must be reduced so that the control system does not overshoot, oscillate or hunt about the control setpoint value. They also have difficulties in the presence of non-linearities, may trade-off regulation versus response time, do not react to changing process behavior (say, the process changes after it has warmed up), and have lag in responding to large disturbances.

The most significant improvement is to incorporate feedforward control with knowledge about the system, and using the PID only to control error. Alternatively, PIDs can be modified in more minor ways, such as by changing the parameters (either gain scheduling in different use cases or adaptively modifying them based on performance), improving measurement (higher sampling rate, precision, and accuracy, and low-pass filtering if necessary), or cascading multiple PID controllers.

Limitations: Linearity

Another problem faced with PID controllers is that they are linear, and in particular symmetric. Thus, performance of PID controllers in non-linear systems (such as HVAC systems) is variable. For example, in temperature control, a common use case is active heating (via a heating element) but passive cooling (heating off, but no cooling), so overshoot can only be corrected slowly—it cannot be forced downward. In this case the PID should be tuned to be overdamped, to prevent or reduce overshoot, though this reduces performance (it increases settling time).

Limitations: Noise in Derivative

A problem with the derivative term is that it amplifies higher frequency measurement or process noise that can cause large amounts of change in the output. It does this so much, that a physical controller cannot have a true derivative term, but only an approximation with limited bandwidth. It is often helpful to filter the measurements with a low-pass filter in order to remove higher-frequency noise components. As low-pass filtering and derivative control can cancel each other out, the amount of filtering is limited. So low noise instrumentation can be important. A nonlinear median filter may be used, which improves the filtering efficiency and practical performance. In some cases, the differential band can be turned off with little loss of control. This is equivalent to using the PID controller as a PI controller.

Modifications to the PID Algorithm

The basic PID algorithm presents some challenges in control applications that have been addressed by minor modifications to the PID form.

Modifications: Integral Windup

One common problem resulting from the ideal PID implementations is integral windup. Following a large change in setpoint the integral term can accumulate an error larger than the maximal value for the regulation variable (windup), thus the system overshoots and continues to increase until this accumulated error is unwound. This problem can be addressed by: (a) disabling the integration until the PV has entered the controllable region, (b) preventing the integral term from accumulating above or below pre-determined bounds, and/or (c) back-calculating the integral term to constrain the regulator output within feasible bounds.

Modifications: Overshooting from Known Disturbances

For example, a PID loop is used to control the temperature of an electric resistance furnace where the system has stabilized. Now when the door is opened and something cold is put into the furnace the temperature drops below the setpoint. The integral function of the controller tends to compensate this error by introducing another error in the positive direction. This overshoot can be avoided by freezing of the integral function after the opening of the door for the time the control loop typically needs to reheat the furnace.

Modifications: PI Controller

A PI Controller (proportional-integral controller) is a special case of the PID controller in which the derivative (D) of the error is not used.

FIG. 18E shows a basic block diagram of a PI controller. The controller output is given by $$K_P \Delta + K_I \int \Delta dt \quad (5)$$

where $\Delta$ is the error or deviation of actual measured value (PV) from the setpoint (SP).

$$\Delta = SP - PV \quad (6)$$

A PI controller can be modelled easily in software such as Simulink or X cos using a "flow chart" box involving Laplace operators:

$$C = \frac{G(1 + \tau s)}{\tau s} \quad (7)$$

where
$G = K_P$ = proportional gain
$G/\tau = K_I$ = integral gain

Setting a value for G is often a trade off between decreasing overshoot and increasing settling time.

The lack of derivative action may make the system more steady in the steady state in the case of noisy data. This is because derivative action is more sensitive to higher-frequency terms in the inputs.

Without derivative action, a PI-controlled system is less responsive to real (non-noise) and relatively fast alterations in state and so the system will be slower to reach setpoint and slower to respond to perturbations than a well-tuned PID system may be.

Modifications: Deadband

Many PID loops control a mechanical device (for example, a valve). Mechanical maintenance can be a major cost and wear leads to control degradation in the form of either stiction or a deadband in the mechanical response to an input signal. The rate of mechanical wear is mainly a function of how often a device is activated to make a change. Where wear is a significant concern, the PID loop may have an output deadband to reduce the frequency of activation of the output (valve). This is accomplished by modifying the controller to hold its output steady if the change would be small (within the defined deadband range). The calculated output must leave the deadband before the actual output will change.

Modifications: Set Point Step Change

The proportional and derivative terms can produce excessive movement in the output when a system is subjected to an instantaneous step increase in the error, such as a large setpoint change. In the case of the derivative term, this is due to taking the derivative of the error, which is very large in the case of an instantaneous step change. As a result, some PID algorithms incorporate some of the following modifications:

Set point ramping. In this modification, the setpoint is gradually moved from its old value to a newly specified value using a linear or first order differential ramp function. This avoids the discontinuity present in a simple step change.

Derivative of the process variable. In this case the PID controller measures the derivative of the measured process variable (PV), rather than the derivative of the error. This quantity is always continuous (i.e., never has a step change as a result of changed setpoint). This modification is a simple case of set point weighting.

Set point weighting. Set point weighting adds adjustable factors (usually between 0 and 1) to the setpoint in the error in the proportional and derivative element of the controller. The error in the integral term must be the true control error to avoid steady-state control errors. These two extra parameters do not affect the response to load disturbances and measurement noise and can be tuned to improve the controller's set point response.

Modifications: Feed-Forward

The control system performance can be improved by combining the feedback (or closed-loop) control of a PID controller with feed-forward (or open-loop) control. Knowledge about the system (such as the desired acceleration and inertia) can be fed forward and combined with the PID output to improve the overall system performance. The feed-forward value alone can often provide the major portion of the controller output. The PID controller primarily has to compensate whatever difference or error remains between the setpoint (SP) and the system response to the open loop control. Since the feed-forward output is not affected by the process feedback, it can never cause the control system to oscillate, thus improving the system response without affecting stability. Feed forward can be based on the setpoint and on extra measured disturbances. Set point weighting is a simple form of feed forward.

For example, in most motion control systems, in order to accelerate a mechanical load under control, more force is required from the actuator. If a velocity loop PID controller is being used to control the speed of the load and command the force being applied by the actuator, then it is beneficial to take the desired instantaneous acceleration, scale that value appropriately and add it to the output of the PID velocity loop controller. This means that whenever the load is being accelerated or decelerated, a proportional amount of force is commanded from the actuator regardless of the feedback value. The PID loop in this situation uses the feedback information to change the combined output to reduce the remaining difference between the process setpoint and the feedback value. Working together, the combined open-loop feed-forward controller and closed-loop PID controller can provide a more responsive control system.

Modifications: Bumpless Operation

PID controllers are often implemented with a "bumpless" initialization feature that recalculates an appropriate integral accumulator term to maintain a consistent process output through parameter changes.

Modifications: Other Improvements

In addition to feed-forward, PID controllers are often enhanced through methods such as PID gain scheduling (changing parameters in different operating conditions), fuzzy logic or computational verb logic. Further practical application issues can arise from instrumentation connected to the controller. A high enough sampling rate, measurement precision, and measurement accuracy are required to achieve adequate control performance. Another new method for improvement of PID controller is to increase the degree of freedom by using fractional order. The order of the integrator and differentiator add increased flexibility to the controller.

Cascade Control

One distinctive advantage of PID controllers is that two PID controllers can be used together to yield better dynamic performance. This is called cascaded PID control. In cascade control there are two PIDs arranged with one PID controlling the setpoint of another. A PID controller acts as outer loop controller, which controls the primary physical parameter, such as fluid level or velocity. The other controller acts as inner loop controller, which reads the output of outer loop controller as setpoint, usually controlling a more rapid changing parameter, flowrate or acceleration. It can be mathematically proven that the working frequency of the controller is increased and the time constant of the object is reduced by using cascaded PID controllers.

For example, a temperature-controlled circulating bath has two PID controllers in cascade, each with its own thermocouple temperature sensor. The outer controller controls the temperature of the water using a thermocouple located far from the heater where it accurately reads the temperature of the bulk of the water. The error term of this PID controller is the difference between the desired bath temperature and measured temperature. Instead of controlling the heater directly, the outer PID controller sets a heater temperature goal for the inner PID controller. The inner PID controller controls the temperature of the heater using a thermocouple attached to the heater. The inner controller's error term is the difference between this heater temperature setpoint and the measured temperature of the heater. Its output controls the actual heater to stay near this setpoint.

The proportional, integral and differential terms of the two controllers will be very different. The outer PID controller has a long time constant—all the water in the tank needs to heat up or cool down. The inner loop responds much more quickly. Each controller can be tuned to match the physics of the system it controls—heat transfer and thermal mass of the whole tank or of just the heater—giving better total response.

Pseudocode

Below is a simple software loop that implements a PID algorithm:

```
previous_error=0
integral=0
start:
error=setpoint−measured_value
integral=integral+error*dt
derivative=(error−previous_error)/dt
output=Kp*error+Ki*integral+Kd*derivative
previous_error=error
wait(dt)
goto start
```

In this example, two variables that will be maintained within the loop are initialized to zero, then the loop begins. The current error is calculated by subtracting the measured_value (the process variable or PV) from the current setpoint (SP). Then, integral and derivative values are calculated and these and the error are combined with three preset gain terms—the proportional gain, the integral gain and the derivative gain—to derive an output value. In the real world, this is D to A converted and passed into the process under control as the manipulated variable (or MV). The current error is stored elsewhere for re-use in the next differentiation, the program then waits until dt seconds have passed since start, and the loop begins again, reading in new values for the PV and the setpoint and calculating a new value for the error.

The invention claimed is:

1. A method for controlling a pace of bidding in a network-based real-time bidding environment, the method comprising:
dynamically adjusting the value of a pacing parameter during a duration of a campaign, by executing a multi-loop control algorithm by a control system of the bidding system, the multi-loop control algorithm including at least an outer control loop and an inner control loop;
wherein the outer control loop is executed by the control system at an outer control loop frequency, wherein each execution of the outer control loop includes:
receiving as outer control loop inputs: (a) an impression setpoint indicating a target number of ad placements purchased during an upcoming outer control loop time period and (b) data indicating an actual number of ad placements purchased during one or more past outer control loop time periods, and
outputting a baseline value of the pacing parameter for the upcoming outer control loop time period;
wherein the inner control loop is executed by the control system at an inner control loop frequency higher than the outer control loop frequency, such that the inner loop is executed multiple times during each execution of the outer control loop;
wherein for each execution of the outer control loop, the inner control loop:
receives the baseline value of the pacing parameter output by the respective execution of the outer control loop, and
executes multiple times to output a dynamically adjusted value of the pacing parameter based on the baseline value of the pacing parameter received from the outer control loop, to thereby adjust the current value of the pacing parameter over time;
wherein each execution of the inner control loop includes:
receiving bid quantity data indicating a number of purchase bids submitted by one or more bidders during an inner control loop time period corresponding with the respective execution of the inner control loop, and
outputting a dynamically adjusted current value of the pacing parameter based at least on the bid quantity data for the inner control loop time period;
receiving at the bidding system via a communications network a series of bid requests generated by a real-time bidding exchange during the duration of the campaign, each received bid request identifying a respective available ad placement in a respective webpage being loaded;
for each received bid request, the bidding system determining, in real-time during the loading of the respective webpage, whether to submit a purchase bid to the real-time bidding exchange to purchase the respective ad placement based at least on the current value of the dynamically adjusted pacing parameter.

2. The computer-implemented method of claim 1, wherein execution of the inner control loop automatically adjusts the pacing parameter in response to a detected increase in a rate of successful bid purchases submitted by the bidding system to decrease the current rate of purchase bids submitted by the bidding system.

3. The computer-implemented method of claim 1, wherein:
the dynamically adjusted pacing parameter comprises a pacing threshold value, and
determining whether to submit a bid to purchase the ad placement corresponding to a particular received bid request comprises:
determining a score for the bid request; and
comparing the determined score for the bid request with a current value of the pacing threshold value.

4. The computer-implemented method of claim 1, wherein the multi-loop control algorithm comprises a proportional-integral-derivative (PID) control algorithm.

5. The computer-implemented method of claim 1, wherein the outer control loop is programmed to:
receive as outer control loop inputs: (a) an impression setpoint indicating a target number of ad placements purchased and (b) data indicating an actual number of ad placements purchased, and
output a bid volume setpoint as the control parameter, the bid volume setpoint comprising a target number of bids submitted to the real-time bidding exchange.

6. The computer-implemented method of claim 5, wherein the inner control loop is programmed to:
receive as inner control loop inputs: (a) the bid volume setpoint output from the outer control loop and (b) data indicating an actual number of submitted purchase bids, and
output the current value of the pacing parameter based on the inner control loop inputs.

7. The computer-implemented method of claim 1, comprising executing both the outer control loop and the inner control loop at a controller of the control system.

8. The computer-implemented method of claim 1, comprising executing the outer control loop at a first controller of the control system, and executing the inner control loop at a second controller of the control system separate from the first controller.

9. The computer-implemented method of claim 1, comprising:
executing the outer control loop at a first controller of the control system;
distributing the control parameter output by the outer control loop executed by the first controller to a plurality of second controllers of the control system; and
executing an instance of the inner control loop at each of the plurality of second controllers.

10. The computer-implemented method of claim 1, wherein:
the outer control loop comprises a proportional-integral (PI) control algorithm; and
the inner control loop comprises a proportional (P) control algorithm.

11. The computer-implemented method of claim 1, wherein:
the dynamically adjusted pacing parameter comprises a pacing threshold value, and
determining whether to submit a bid to purchase the respective ad placement for a received bid request comprises:

determining a score for the bid request; and comparing the determined score for the bid request with a current value of the pacing threshold value output by the inner control loop of the multi-loop control algorithm.

12. The computer-implemented method of claim 1, wherein the inner control loop of the multi-loop control algorithm is programmed to increase the pacing parameter upon defined conditions, but prevented from decreasing the pacing parameter.

13. The computer-implemented method of claim 1, wherein the inner control loop of the multi-loop control algorithm is prevented from decreasing the pacing parameter below the baseline value output by the outer control loop.

14. A control system configured to control a pace of bidding in a network-based real-time bidding environment, the control system comprising:

at least one processor; and computer-readable instructions stored in non-transitory computer readable medium and executable by the at least one processor to:

dynamically adjust the value of a pacing parameter during a duration of a campaign by executing a multi-loop control algorithm including at least an outer control loop and an inner control loop;

wherein the outer control loop is executed at an outer control loop frequency, wherein each execution of the outer control loop includes:

receiving as outer control loop inputs: (a) an impression setpoint indicating a target number of ad placements purchased during an upcoming outer control loop time period and (b) data indicating an actual number of ad placements purchased during one or more past outer control loop time periods, and outputting a baseline value of the pacing parameter for the upcoming outer control loop time period;

wherein the inner control loop is executed at an inner control loop frequency higher than the outer control loop frequency, such that the inner loop is executed multiple times during each execution of the outer control loop;

wherein for each execution of the outer control loop, the inner control loop:

receives the baseline value of the pacing parameter output by the respective execution of the outer control loop, and executes multiple times to output a dynamically adjusted value of the pacing parameter based on the baseline value of the pacing parameter received from the outer control loop, to thereby adjust the current value of the pacing parameter over time;

wherein each execution of the inner control loop includes:

receiving bid quantity data indicating a number of purchase bids submitted by one or more bidders during an inner control loop time period corresponding with the respective execution of the inner control loop, and outputting a dynamically adjusted current value of the pacing parameter based at least on the bid quantity data for the inner control loop time period;

receive via a communications network a series of bid requests generated by a real-time bidding exchange during the duration of the campaign, each received bid request identifying a respective available ad placement in a respective webpage being loaded; and for each received bid request, determine in real-time during the loading of the respective webpage whether to submit a purchase bid to the real-time bidding exchange to purchase the respective ad placement based at least on the current value of the dynamically adjusted pacing parameter.

15. A method for controlling a pace of bidding in a network-based real-time bidding environment, the method comprising:

receiving at a bidding system a series of bid requests from a real-time bidding exchange, each bid request corresponding to an ad placement in a webpage being loaded;

for each received bid request, the bidding system determining, in real-time during the loading of the respective webpage, whether to submit a purchase bid to the real-time bidding exchange to purchase the respective ad placement; and executing a multi-loop control algorithm by the bidding system to dynamically control a rate at which purchase bids are submitted to the real-time bidding exchange over time, wherein the multi-loop control algorithm includes at least an outer control loop and an inner control loop for dynamically adjusting the value of a pacing parameter influencing the rate at which purchase bids are submitted to the real-time bidding exchange, wherein the outer control loop is executed at an outer control loop frequency, wherein each execution of the outer control loop includes:

receiving as outer control loop inputs: (a) an impression setpoint indicating a target number of ad placements purchased during an upcoming outer control loop time period and (b) data indicating an actual number of ad placements purchased during one or more past outer control loop time periods, and outputting a baseline value of the pacing parameter for the upcoming outer control loop time period;

wherein the inner control loop is executed at an inner control loop frequency higher than the outer control loop frequency, such that the inner loop is executed multiple times during each execution of the outer control loop;

wherein for each execution of the outer control loop, the inner control loop:

receives the baseline value of the pacing parameter output by the respective execution of the outer control loop, and executes multiple times to output a dynamically adjusted value of the pacing parameter based on the baseline value of the pacing parameter received from the outer control loop, to thereby adjust the current value of the pacing parameter over time;

wherein each execution of the inner control loop includes:

receiving bid quantity data indicating a number of purchase bids submitted by one or more bidders during an inner control loop time period corresponding with the respective execution of the inner control loop, and outputting a dynamically adjusted current value of the pacing parameter based at least on the bid quantity data for the inner control loop time period.

16. The computer-implemented method of claim 15, wherein the current value of the pacing parameter is used as input by the bidding system for the determination of whether to submit a purchase bid for each received bid request.

17. The computer-implemented method of claim 16, wherein the inner control loop is programmed to, in response to a detected increase in the rate of purchase bids submitted by the bidding system, automatically adjust the pacing parameter to decrease the rate at which purchase bids are submitted.

18. The computer-implemented method of claim 15, comprising:
   for each received bid request, determining whether to submit a purchase bid to purchase the respective ad placement based at least on the dynamically adjusted value of the pacing parameter output by the multi-loop control algorithm.

* * * * *